United States Patent
Klee et al.

(10) Patent No.: US 12,339,261 B2
(45) Date of Patent: Jun. 24, 2025

(54) METHOD AND APPARATUS FOR MASS ANALYSING A SAMPLE

(71) Applicant: TOFWERK AG, Thun (CH)

(72) Inventors: Sonja Klee, Reutigen (CH); Steffen Bräkling, Thun (CH); Marc Gonin, Thun (CH); Urs Rohner, Thun (CH); Carsten Stoermer, Thun (CH)

(73) Assignee: TOFWERK AG, Thun (CH)

( * ) Notice: Subject to any disclaimer, the term of this patent is extended or adjusted under 35 U.S.C. 154(b) by 627 days.

(21) Appl. No.: 17/724,735

(22) Filed: Apr. 20, 2022

(65) Prior Publication Data

US 2022/0334092 A1 Oct. 20, 2022

(30) Foreign Application Priority Data

Apr. 20, 2021 (EP) .................................. 21 169 458

(51) Int. Cl.
*G01N 30/72* (2006.01)
*G01N 30/86* (2006.01)

(52) U.S. Cl.
CPC ..... *G01N 30/7266* (2013.01); *G01N 30/8644* (2013.01)

(58) Field of Classification Search
USPC .................................................. 250/282, 281
See application file for complete search history.

(56) References Cited

U.S. PATENT DOCUMENTS

2014/0179020 A1\* 6/2014 Wright .................. G16C 20/20 702/23
2017/0315101 A1\* 11/2017 Green ..................... G01N 30/06
(Continued)

FOREIGN PATENT DOCUMENTS

WO WO 03/104763 A2 12/2003

OTHER PUBLICATIONS

European Search Report from corresponding European Patent Application No. EP 21 16 9458 mailed on Oct. 12, 2021.

*Primary Examiner* — Kiet T Nguyen
(74) *Attorney, Agent, or Firm* — Davidson Kappel LLC

(57) ABSTRACT

The invention relates to a method for mass analysing a sample by ionising the sample to first sample ions and to second sample ions and by obtaining mass spectra from the first sample ions and the second sample ions with a mass analyser (5). Thereby, repeatedly, a first assay is obtained from the sample and transferred past any chromatography column to a first ion source (2) and ionised by the first ion source (2) to the first sample ions, wherein the first sample ions obtained from the respective first assay are transferred to the mass analyser (5), wherein at least one first mass spectrum is obtained with the mass analyser (5) from the first sample ions obtained from the respective first assay and ionised by and transferred from the first ion source (2). Furthermore, at least once, a second assay is obtained from the sample within a time window being associated with the respective second assay and having a window width, wherein the respective second assay is transferred for chromatographic separation via a chromatography column (3) to at least one second ion source (4.1, 4.2) in that after being chromatographically separated, the respective second assay eluting from the chromatography column (3) is transferred to the at least one second ion source (4.1, 4.2) and ionised by the at least one second ion source (4.1, 4.2) to the second sample ions, wherein the second sample ions obtained from the respective second assay are transferred to the mass analyser (5), wherein at least one second mass spectrum is obtained with the mass analyser (5) from the second sample ions obtained from the respective second assay which has been ionised by and transferred from the at least one second ion source (4.1, 4.2). Thereby, each one of the at least one second mass spectrum is assigned to one or more of the at (Continued)

least one first mass spectrum from the first sample ions obtained from one of the first assays which has been obtained from the sample within the time window associated with the respective second assay which has been chromatographically separated and ionised by the at least one second ion source (4.1, 4.2) to the second sample ions from which the respective one of the at least one second mass spectrum has been obtained. Furthermore, the invention relates to an apparatus (1) for mass analysing a sample with the method according to the invention.

19 Claims, 3 Drawing Sheets

(56) References Cited

U.S. PATENT DOCUMENTS

2019/0355563 A1  11/2019  Cheung et al.
2021/0193446 A1* 6/2021  Kalafut .................. H01J 49/26

* cited by examiner

METHOD AND APPARATUS FOR MASS ANALYSING A SAMPLE

This application is a Utility Patent Application under 35 U.S.C. § 119 claiming priority from European Application No. 21 169 458.3, Apr. 20, 2021, the disclosure of which is all hereby incorporated by reference herein.

TECHNICAL FIELD

The invention relates to a method for mass analysing a sample by ionising the sample to first sample ions and to second sample ions and by obtaining mass spectra from the first sample ions and the second sample ions with a mass analyser. Furthermore, the invention relates to an apparatus for mass analysing a sample with the method according to the invention.

BACKGROUND ART

Shared across many domains of analysis like food safety, environmental research, clinical research, forensic toxicology and doping control, the requirement to detect and determine very high numbers of known and unknown substances in a wide variety of sample matrices is essential. The levels of substance abundance within a single sample is thereby often ranging from sub µg/kg level to low mg/kg level which makes the simultaneous detection of the different substances challenging.

In the literature, the analysis of such samples is broadly shown to be a very difficult task. In almost every case, unknown compounds can exist in such a sample in high concentration and/or in severe toxic potential. Nowadays, many scientists in the mentioned fields even believe that the concentration of unknown compounds exceed by far the concentration of the known compounds.

In case of targeted analysis, where the analysis is focused on specific, known and thus targeted compounds, the information about the unknown and thus untargeted compounds is often lost. Therefore, these targeted methods have to be expanded to include the information about non-targeted substances, too.

Methods and apparatuses pertaining to the technical field have been employed when it came to extend targeted analysis methods to non-targeted analysis methods. For example, since the end of the 20th century, the application of soft ionisation methods like electrospray ionisation (ESI) and atmospheric pressure ionization (APCI) in mass spectrometry have shown to maintain higher sensitivities as well as more limited fragmentation of molecules to be detected. Furthermore, more robust and more sensitive high resolution mass spectrometers (HRMS) have become available. These high resolution mass spectrometers allow the separation of substances with smaller mass differences. Furthermore, the high-speed-internet opened up completely new possibilities for researchers to exchange and process data. Since the 2010s, the development of online mass spectral libraries like for example MassBank, METLIN and mzCloud and analysis software packages have enabled processing huge amounts of data generated by the new techniques.

All these factors enable a broader, non-targeted analysis of samples. Nonetheless, obtaining combined a targeted analysis and a non-targeted analysis is still difficult and expensive, while still, unknown compounds in a sample can often not be identified as desired.

SUMMARY OF THE INVENTION

It is the object of the invention to create a method and an apparatus for mass analysing a sample by ionising the sample to first sample ions and to second sample ions and by obtaining mass spectra from the first sample ions and the second sample ions with a mass analyser, the method and the apparatus pertaining to the technical field initially mentioned, that enable an optimised targeted analysis and an improved non-targeted analysis of the sample in a cost effective way.

The solution of the invention is specified by the features of claim 1. According to the invention, repeatedly, a first assay is obtained from the sample, transferred past any chromatography column and thus directly without any chromatographic separation to a first ion source and ionised by the first ion source to the first sample ions, wherein the first sample ions obtained from the respective first assay are transferred to the mass analyser, wherein at least one first mass spectrum is obtained with the mass analyser from the first sample ions obtained from the respective first assay and ionised by and transferred from the first ion source. Furthermore, according to the invention, at least once, a second assay is obtained from the sample within a time window being associated with the respective second assay and having a window width, wherein the respective second assay is transferred for chromatographic separation via a chromatography column to at least one second ion source in that after being chromatographically separated, the respective second assay eluting from chromatography column is transferred to at least one second ion source and ionised by the at least one second ion source to the second sample ions, wherein the second sample ions obtained from the respective second assay are transferred to the mass analyser, wherein at least one second mass spectrum is obtained with the mass analyser from the second sample ions obtained from the respective second assay which has been ionised by and transferred from the at least one second ion source. Thereby, each one of the at least one second mass spectrum is assigned to one or more of the at least one first mass spectrum from the first sample ions obtained from one of the first assays which has been obtained from the sample within the time window associated with the respective second assay which has been chromatographically separated and ionised by the at least one second ion source to the second sample ions from which the respective one of the at least one second mass spectrum has been obtained.

As mentioned, according to the invention, repeatedly, a first assay is obtained from the sample, transferred past any chromatography column and thus directly without any chromatographic separation to a first ion source and ionised by the first ion source to the first sample ions, wherein the first sample ions obtained from the respective first assay are transferred to the mass analyser, wherein at least one first mass spectrum is obtained with the mass analyser from the first sample ions obtained from the respective first assay and ionised by and transferred from the first ion source. Thus, obtaining a first assay from the sample, transferring the respective first assay past any chromatography column to the first ion source and ionising the respective first assay by the first ion source to the first sample ions, transferring the first sample ions obtained from the respective first assay to the mass analyser and obtaining at least one first mass spectrum with the mass analyser from the first sample ions obtained from the respective first assay is repeated multiple times.

During or between these repetitions, at least once, a second assay is obtained from the sample within the time window being associated with the respective second assay and having the window width, wherein the respective second assay is transferred for chromatographic separation via the chromatography column to the at least one second ion source in that after being chromatographically separated, the respective second assay eluting from chromatography column is transferred to the at least one second ion source and ionised by the at least one second ion source to the second sample ions, wherein the second sample ions obtained from the respective second assay are transferred to the mass analyser, wherein the at least one second mass spectrum is obtained with the mass analyser from the second sample ions obtained from the respective second assay which has been ionised by and transferred from the at least one second ion source. Thereby, each one of the at least one second mass spectrum is assigned to one or more of the at least one first mass spectrum from the first sample ions obtained from one of the first assays which has been obtained from the sample within the time window associated with the respective second assay which has been chromatographically separated and ionised by the at least one second ion source to the second sample ions from which the respective one of the at least one second mass spectrum has been obtained. Thereby, the time window preferably covers a continuous time period having a length of the window width of the respective time window. The window width may be a predefined length in time or may be variable. For example, the time window may simply range from when the last first assay has been obtained from the sample before the respective second assay has been obtained from the sample to when the respective second assay has been obtained from the sample. In another example, the time window may simply range from when the respective second assay has been obtained from the sample to when the first first assay has been obtained from the sample after the respective second assay has been obtained from the sample. In either example, the respective time window and the respective window width are defined by when the respective first assay and the respective second assay have been obtained from the sample. Thus, in such a case, the time window and the window width are not required to be given in time units when executing the method. Rather, it is sufficient to relate the time window and the window width to when the respective first assay and the respective second assay have been obtained from the sample. On the other hand, in other examples, the time window and the time window width are defined in time units. In one such example, the time window starts five seconds before the respective second assay is obtained from the sample and lasts for ten seconds. In another example, the time window starts five seconds before the respective second assay is obtained from the sample and ends five seconds after the respective second assay is obtained from the sample. Thus, in this latter case, since obtaining the second assay from the sample takes some time, the window width is somewhat longer than ten seconds. Independent of how the time window and the window width are given, however, the window width is advantageously finite. This has the advantage that a meaningful assignment of the respective at least one second mass spectrum to the respective at least one first mass spectrum is enabled.

According to the invention, the apparatus for mass analysing a sample with the method according to the invention includes the first ion source for repeatedly receiving a first assay obtained from the sample and for ionising the respective first assay to first sample ions and includes a chromatography column for receiving at least once a second assay for chromatographically separating the respective second assay by passing the respective second assay through the chromatography column, wherein the respective second assay has been obtained from sample within the time window associated with the respective second assay, time window having the window width. Furthermore, the apparatus includes the at least one second ion source fluidly coupled to the chromatography column for receiving and ionising to second sample ions the respective second assay eluting from the chromatography column. Additionally, the apparatus includes the mass analyser fluidly coupled to the first ion source for receiving the first sample ions obtained from the respective first assay and for obtaining at least one first mass spectrum signal with the mass analyser from the first sample ions obtained from the respective first assay and ionised by and received from the first ion source for obtaining the at least one first mass spectrum, wherein the mass analyser is additionally fluidly coupled to the at least one second ion source for receiving the second sample ions and for obtaining at least one second mass spectrum signal from the second sample ions obtained from the respective second assay which has been ionised by and received from the at least one second ion source for obtaining the at least one second mass spectrum. The apparatus further includes a mass spectrum acquisition arrangement for obtaining the at least one first mass spectrum from the at least one first mass spectrum signal and for obtaining at least one second mass spectrum from the at least one second mass spectrum signal, and an assignment module for assigning each one of at least one second mass spectrum to one or more of the at least one first mass spectrum from the first sample ions obtained from one of the first assays which has been obtained from the sample within the time window associated with the respective second assay which has been chromatographically separated and ionised by the at least one second ion source to the second sample ions from which the respective one of the at least one second mass spectrum has been obtained.

Thereby, in a first preferred variant, the mass spectrum acquisition arrangement is part of the mass analyser. In this case, the mass analyser is considered as providing the respective mass spectrum. In a second preferred variant, however, the mass spectrum acquisition arrangement is separate from the mass analyser. In this latter variant, the mass acquisition arrangement is advantageously connected to the mass analyser for receiving the at least one first mass spectrum signal and the at least one second mass spectrum signal from the mass analyser. Independent of whether the mass spectrum acquisition arrangement is part of the mass analyser or separate from the mass analyser, in a first variation, the assignment module is a module separate from the mass spectrum acquisition arrangement and separate from the mass analyser, while in a second variation, the assignment module is part of the mass spectrum acquisition arrangement.

Thus, in case in the apparatus, the mass spectrum acquisition arrangement is separate from the mass analyser, when obtaining the at least one first mass spectrum with the mass analyser from the first sample ions obtained from the respective first assay and ionised by and transferred from the first ion source, preferably the at least one first mass spectrum is obtained by the mass spectrum acquisition arrangement which receives at least one first mass spectrum signal from the mass analyser, while when obtaining the at least one second mass spectrum with the mass analyser from the second sample ions obtained from the respective second assay and ionised by and transferred from the at least one second ion source, preferably the at least one second mass spectrum is obtained by the mass spectrum acquisition arrangement which receives at least one second mass spectrum signal from the mass analyser. Thereby, the mass spectrum acquisition arrangement may be part of the mass analyser or may be separate from the mass analyser.

The solution according to the invention has the advantage that with repeatedly obtaining a first assay from the sample, transferring the respective first assay past any chromatography column to the first ion source and ionising the respective first assay by the first ion source to the first sample ions, transferring the first sample ions obtained from the respective first assay to the mass analyser and obtaining the at least one first mass spectrum with the mass analyser from the first sample ions obtained from the respective first assay and ionised by and transferred from the first ion source, a targeted analysis of the sample is enabled by mass analysing the sample. Even more, a targeted analysis of the sample over time is enabled by repeatedly analysing the sample. Thereby, whenever a non-targeted analysis is desired during this targeted analysis of the sample, a second assay is obtained from the sample, chromatographically separated and subsequently mass analysed. Since this second assay is chromatographically separated before being ionised and mass analysed, more constituent parts in the sample can be resolved in the at least one second mass spectrum than in the at least one first mass spectrum, enabling the non-targeted analysis of the sample. Thereby, by assigning the at least one second mass spectrum obtained from the respective second assay to the at least one first mass spectrum obtained from one of the first assays which has been obtained from the sample in the same time window as the respective second assay has been obtained from the sample, a proper comparison of the results from the non-targeted analysis of the sample with the targeted analysis of the sample is enabled, even though due to the chromatographic separation of the second assay, the respective at least one second mass spectrum may be obtained considerably later than the respective at least one first mass spectrum has been obtained. This fact in enables to properly analyse a sample targeted and non-targeted even if the sample changes over time. Thereby, the analysis can be adapted to the speed with which the sample changes by adapting the repetition rate of obtaining the first assays from the sample and by adapting the time window and the window width of the time window correspondingly.

Furthermore, since both the mass analysis of the first assay and the mass analysis of the second assay are obtained with the same mass analyser, the apparatus according to the invention can be constructed less expensive because only one mass analyser is required. Thus, due to the lower costs for the equipment, the method according to the invention can be executed more cost effective, too.

Preferably, each one of the at least one second mass spectrum is assigned by an assignment module to one or more of the at least one first mass spectrum from the first sample ions obtained from one of the first assays which has been obtained from the sample within the time window associated with the respective second assay which has been chromatographically separated and ionised by the at least one second ion source to the second sample ions from which the respective one of the at least one second mass spectrum has been obtained. This has the advantage that the at least one second mass spectrum can be assigned automatically by the assignment module to the corresponding one or more of the at least one first mass spectrum, which makes the method more efficient. In this case, the apparatus preferably includes the assignment module.

Alternatively, however, not each one of the at least one second mass spectrum is assigned by an assignment module to one or more of the at least one first mass spectrum from the first sample ions obtained from one of the first assays which has been obtained from the sample within the time window associated with the respective second assay which has been chromatographically separated and ionised by the at least one second ion source to the second sample ions from which the respective one of the at least one second mass spectrum has been obtained. In case none of the at least one second mass spectrum is assigned by an assignment module to the corresponding one or more of the at least one first mass spectrum, the apparatus may go without such an assignment module.

In an advantageous variant, at least one of the at least one first mass spectrum is obtained with the mass analyser from only the first sample ions obtained from the respective first assay which has been ionised by and transferred from the first ion source. Thus, the respective at least one of the at least one first mass spectrum contains only information about the first sample ions obtained from the respective first assay which has been ionised by and transferred from the first ion source. Therefore, the respective at least one of the at least one first mass spectrum contains no information about first sample ions obtained from another first assay which has been ionised by and transferred from the first ion source. Furthermore, the respective at least one of the at least one first mass spectrum contains no information about second sample ions obtained from any second assay which has been ionised by and transferred from the respective at least one second ion source. Thus, the advantage is obtained that the sample can be analysed more accurately. In particular in case in each repetition of obtaining first assay, the at least one of the at least one first mass spectrum is obtained with the mass analyser from only the first sample ions obtained from the respective first assay which has been ionised by and transferred from the first ion source, a more accurate time dependent non-targeted analysis of the sample is enabled.

In an alternative, however, none of the at least one first mass spectrum is obtained with the mass analyser from only the first sample ions obtained from the respective first assay which has been ionised by and transferred from the first ion source.

Preferably, at least one of the at least one second mass spectrum is obtained with the mass analyser from only the second sample ions obtained from the respective second assay which has been ionised by and transferred from the at least one second ion source. Thus, the respective at least one of the at least one second mass spectrum contains only information about the second sample ions obtained from the respective second assay which has been ionised by and transferred from respective at least one second ion source. Therefore, the respective at least one the this at least one second mass spectrum contains no information about first sample ions obtained from any first assay which has been ionised by and transferred from the first ion source. Furthermore, the respective at least one of this at least one second mass spectrum contains no information about second sample ions obtained from any other second assay which has been ionised by and transferred from the respective at least one second ion source. Thus, a more accurate non-targeted analysis of the sample is enabled.

In an alternative, however, none of the at least one second mass spectrum is obtained with the mass analyser from only the second sample ions obtained from the respective second assay which has been ionised by and transferred from the at least one second ion source.

Advantageously, each one of the at least one first mass spectrum is assigned to the respective first assay which has been ionised by the first ion source to the first sample ions from which the respective one of said at least one first mass spectrum has been obtained. This has the advantage, that a more precise knowledge about the individual first assays that are repeatedly obtained from the sample can be obtained.

Alternatively, only some or none of the at least one first mass spectrum is assigned to the respective first assay which has been ionised by the first ion source to the first sample ions from which the respective one of said at least one first mass spectrum has been obtained.

Advantageously, each one of the at least one second mass spectrum is assigned to the respective second assay which has been ionised by the at least one second ion source to the second sample ions from which the respective one of the at least one second mass spectrum has been obtained. This has the advantage, that a more precise knowledge about the respective second assay can be obtained. This is particular advantageous in case more than one second assay is obtained from the sample, chromatographically separated and mass analysed.

Alternatively, only some or none of the at least one second mass spectrum is assigned to the respective second assay which has been ionised by the at least one second ion source to the second sample ions from which the respective one of the at least one second mass spectrum has been obtained.

Preferably, the respective second assay is preconcentrated after being obtained from the sample and before being transferred for chromatographic separation via the chromatography column to the at least one second ion source. This has the advantage that a more sensitive analysis of the respective second assay is enabled.

Alternatively, however, the respective second assay is transferred for chromatographic separation via the chromatographic column to the at least one second ion source without being preconcentrated preliminarily.

Advantageously, the mass analyser is a time of flight mass analyser. Alternatively, however, the mass analyser is another type of mass analyser than a time of flight mass analyser. In an example, the mass analyser is a quadrupole mass analyser.

Advantageously, the second sample ions are separated according to their ion mobility when being transferred from the respective one of the second ion source to the mass analyser for obtaining the respective at least one second mass spectrum from the respective second sample ions, wherein the second sample ions are transferred to the mass analyser separated according to their mobility.

This has the advantage that an improved non-targeted analysis of the sample can be obtained. Independent of whether the second sample ions are separated according to their ion mobility when being transferred from the respective one of the second ion source to the mass analyser for obtaining the respective at least one second mass spectrum from the respective second sample ions, wherein the second sample ions are transferred to the mass analyser separated according to their mobility, advantageously, the first sample ions are separated according to their ion mobility when being transferred from the first ion source to the mass analyser for obtaining the respective at least one first mass spectrum from the respective first sample ions, wherein the first sample ions are transferred to the mass analyser separated according to their mobility. This has the advantage that an improved analysis of the first assays can be obtained. In case both the first sample ions and the second sample ions are separated according to their ion mobility when being transferred from the first ion source or the respective one of the second ion source, respectively, to the mass analyser for obtaining the respective at least one first mass spectrum form the respective first sample ions or the respective at least one second mass spectrum from the respective second sample ions, wherein first sample ions and the second sample ions are transferred to the mass analyser separated according to their mobility, an overall improved analysis of the sample can be obtained.

In this case, the apparatus advantageously includes an ion mobility separation region for separating first sample ions and/or second sample ions according to their mobility, the ion mobility separation region being arranged upstream of the mass analyser.

In an alternative, however, neither the first sample ions nor the second sample ions are separated according to their ion mobility and the apparatus goes without ion mobility separation arrangement.

Preferably, the second assay is repeatedly obtained from the sample, each time within a respective time window being associated with the respective one of the second assay and having a window width, wherein the respective the second assay is transferred for chromatographic separation via a chromatography column to the at least one second ion source in that after being chromatographically separated, the respective second assay is transferred to the at least one second ion source and ionised by the at least one second ion source to the second sample ions, wherein the second sample ions obtained from the respective second assay are transferred to the mass analyser, wherein at least one second mass spectrum is obtained with said mass analyser from the second sample ions obtained from the respective second assay which has been ionised by and transferred from the at least one second ion source, wherein each one of the at least one second mass spectrum is assigned to one or more of the at least one first mass spectrum from the first sample ions obtained from one of the first assays which has been obtained from the sample within the respective time window associated with the respective second assay which has been chromatographically separated and ionised by at least one second ion source to said second sample ions from which the respective one of the at least one second mass spectrum has been obtained.

Thus, obtaining a second assay from the sample, transferring the respective second assay for chromatographic separation via the chromatography column to the at least one second ion source and ionising respective second assay by the respective one of the second ion source to the second sample ions, transferring the second sample ions obtained from the respective second assay to the mass analyser and obtaining at least one second mass spectrum with the mass analyser from the second sample ions obtained from the respective second assay is repeated multiple times.

Thereby, preferably at least one of this at least one second mass spectrum is obtained with the mass analyser from only the second sample ions obtained from the respective second assay which has been ionised by and transferred from the respective at least one second ion source. In an alternative, however, none of the at least one second mass spectrum is obtained with the mass analyser from only the second sample ions obtained from the respective second assay which has been ionised by and transferred from the at least one second ion source.

In an alternative to repeatedly obtaining a second assay from the sample, chromatographically separating the respective second assay and mass analysing the respective second assay, it is as well possible to obtain only once a second assay from the sample, chromatographically separate the respective second assay and mass analyse the respective second assay.

Independent of whether only once, whether twice, multiple times or repeatedly, a second assay is obtained from the sample, chromatographically separated and mass analysed the respective second assay, the window width of the time window is advantageously 5 minutes or less, preferably, 1 minute or less, particular preferably 10 seconds or less. Thereby, the window width is advantageously more than 0.000000001 second.

In an advantageous variant, the window width of the time window is from 1 minute to 5 minutes long, from 10 seconds to 1 minute long, or from 1 second to 10 seconds long.

In an alternative, however, the window width of the time window is longer than 5 minutes or less than 1 second, in particular 0.000000001 second or less.

As repeatedly, a first assay is obtained from the sample and transferred past any chromatography column to the first ion source and ionised by the first ion source to the first sample ions, wherein the first sample ions obtained from the respective first assay are transferred to the mass analyser, wherein at least one first mass spectrum is obtained with the mass analyser from the first sample ions obtained from the respective first assay and ionised by and transferred from the first ion source, advantageously, the at least one first mass spectrum obtained with the mass analyser from the first sample ions obtained from the respective first assay and ionised by and transferred from the first ion source is inspected with a filter module for events of interest measured with the mass analyser as soon as the respective one of the at least one first mass spectrum is obtained with the mass analyser, particular advantageous within 5 seconds, most advantageous within 1 second after being obtained with the mass analyser. Thereby, whenever an event of interest is detected with the filter module, a second assay is obtained from the sample within the time window being associated with the respective second assay and having the window width, wherein the respective time window starts at a time when the one of the first assays from which the first sample ions have been obtained from which the respective one of the at least one first mass spectrum has been obtained in which the event of interest has been detected with the filter module, wherein the respective second assay is transferred for chromatographic separation via the chromatography column to the at least one second ion source in that after being chromatographically separated, the respective second assay eluting from the chromatography column is transferred to the at least one second ion source and ionised by the at least one second ion source to the second sample ions, wherein the second sample ions obtained from the respective second assay are transferred to the mass analyser, wherein at least one second mass spectrum is obtained with the mass analyser from the second sample ions obtained from the respective the second assay which has been ionised by and transferred from the at least one second ion source, wherein at least one of the respective at least one second mass spectrum is assigned to the one of the at least one first mass spectrum in which the event of interest has been detected with the filter module.

Thereby, the inspection is advantageously based on a filter definition, the filter definition comprising at least one region of interest (ROI) including a selection of values of m/Q in the respective one of the at least one mass spectrum and further comprising at least one filter criterion to be applied to the at least one region of interest.

If there is a plurality of regions of interest, they may be overlapping or non-overlapping. They do not need to cover the entire respective mass spectrum. Generally, the values of m/Q included in the selection relate to expected peaks, i. e. m/Q values of ions obtained from expected constituents of the analysed sample. It is also possible to define ROIs that comprise only a fraction of a peak, e. g. in cases of heavily occupied nominal masses. The selection may include neighbouring as well as distanced values. A variety of filter criteria may be employed. An event may be detected if a certain filter criterion is met or if a certain filter criterion is not met. An example of filter criteria are threshold values. The thresholds may be fixed or depend from characteristics of the measured spectrum or spectra.

Advantageously, the selection of values of m/Q is a subsection of all values of m/Q of the entire respective one of the at least one mass spectrum. Consequently, at least one value of m/Q values of the entire respective one of the at least one mass spectrum is excluded from the selection of values of m/Q. The selection may include values lying next to each other or distanced values. That means the selection may for example include low m/Q values and high m/Q values without the middle part of the respective one of the at least one mass spectrum.

How the procedure of the inspection of the at least one first mass spectrum for events of interest measured with the mass analyser can be implemented is known in the art and for example described in detail in WO 2016/004542 A1 of Tofwerk AG as "event triggering". While in WO 2016/004542 A1, the inspection is used for deciding whether a mass spectrum is forwarded for further analysis or rejected, in the above described preferred embodiment, the inspection is used to decide on whether a second assay is to be obtained from the sample, chromatographically separated and mass analysed.

In an alternative to or in addition to inspecting the at least one first mass spectrum for events of interest measured with the mass analyser and, whenever an event of interest is detected, obtaining, chromatographically separating and mass analysing the respective second assay, the second assay is repeatedly obtained from said sample, chromatographically separated and mass analysed at arbitrary time intervals or periodically. In one example, every 5 minutes, a second assay is obtained from the sample, chromatographically separated and mass analysed. Shorter or longer periods than these exemplary 5 minutes are however as well possible.

Preferably, after being chromatographically separated, a stream of chromatographically separated shares of the respective second assay eluting from the chromatography column is transferred to the at least one second ion source and ionised by the at least one second ion source to a corresponding stream of chromatographically separated shares of the second sample ions, wherein the stream of chromatographically separated shares of the second sample ions is transferred to the mass analyser in a time evolution corresponding to a time evolution of the stream of chromatographically separated shares of the respective second assay eluting from the chromatography column, wherein successively, at least ten second mass spectra, preferably at least twenty second mass spectra, are obtained with the mass analyser from the stream of chromatographically separated shares of the second sample ions for accessing information about a time dependent evolution of constituent parts of the stream of chromatographically separated shares of the respective second assay in the at least ten second mass spectra, or at least twenty second mass spectra, respectively. Thereby, the stream of chromatographically separated shares of the respective second assay eluting from the chromatography column may be a continuous or a discontinuous stream. Furthermore, the stream of chromatographically separated shares of the second sample ions may be a continuous or a discontinuous stream. Independent whether these streams are continuous or discontinuous streams, the stream of chromatographically separated shares of the second sample ions is preferably transferred to the mass analyser in a time evolution corresponding to the time evolution of the stream of chromatographically separated shares of the respective second assay eluting from the chromatography column. Thereby, the time evolution of the stream of chromatographically separated shares of the second sample ions is not required to be identical to the time evolution of the stream of chromatographically separated shares of the respective second assay eluting from the chromatography column. Rather, the time evolution of the stream of chromatographically separated shares of the second sample ions may for example be stretched, in sections stretched, compressed, in sections compressed or bundled to a sequence of bunches of second sample ions and thus discretised as compared to the time evolution of the stream of chromatographically separated shares of the respective second assay eluting from the chromatography column.

Preferably, at least ten of these at least ten second mass spectra, particular preferably at least twenty of these at least twenty second mass spectra, are obtained with the mass analyser from only the second sample ions obtained from the stream of chromatographically separated shares of the second sample ions and thus from the respective second assay which has been ionised and transferred from the at least one second ion source for accessing information about a time dependent evolution of constituent parts of the stream of chromatographically separated shares of the respective second assay in the at least ten of the at least ten second mass spectra or at least twenty of the at least twenty second mass spectra, respectively.

Advantageously the at least one second ion source comprises at least two second ion sources and thus are at least two ion sources, wherein after being chromatographically separated, the respective second assay eluting from the chromatography column is transferred to the at least two second ion sources, wherein the respective second assay eluted from the chromatography column is divided into parts, wherein to each one of the at least two second ion sources, another one of the parts is transferred, wherein by each one of the at least two second ion sources, the respective one of the parts which is transferred to the respective one of the at least two second ion sources is ionised to the second sample ions, wherein the second sample ions obtained from the respective second assay are transferred to the mass analyser, wherein at least one second mass spectrum is obtained with the mass analyser from the second sample ions obtained from the respective second assay which has been ionised by and transferred from the at least two second ion sources.

This has the advantage that a further improved non-targeted analysis of the respective second assay is enabled because with each one of the two second ion sources, another ionisation principle having other ionisation characteristics can be employed.

Thereby, preferably at least one of this at least one second mass spectrum is obtained with the mass analyser from only the second sample ions obtained from the respective second assay which has been ionised by and transferred from the at least two second ion sources. In an alternative, however, none of the at least one second mass spectrum is obtained with the mass analyser from only the second sample ions obtained from the respective second assay which has been ionised by and transferred from the at least two second ion sources.

In case after being chromatographically separated, a continuous or discontinuous stream of chromatographically separated shares of the respective second assay eluting from the chromatography column is transferred to the at least one second ion source and ionised by the at least one second ion source to a corresponding continuous or discontinuous stream of chromatographically separated shares of the second sample ions, preferably the at least one second ion source are at least two second ion sources, wherein after being chromatographically separated, the respective stream of chromatographically separated shares of the respective second assay eluting from the chromatography column is preferably transferred to the at least two second ion sources, wherein the respective stream of chromatographically separated shares of the respective second assay eluted from the chromatography column is preferably divided into parts, wherein to each one of the at least two second ion sources, another one of the parts is transferred, wherein by each one of the at least two second ion sources, the respective one of the parts which is transferred to the respective one of the at least two second ion sources is ionised to the second sample ions, wherein the second sample ions obtained from the respective stream of chromatographically separated shares of the respective second assay are transferred to the mass analyser, wherein at least one second mass spectrum is obtained with the mass analyser from the second sample ions obtained from the respective stream of chromatographically separated shares of the respective second assay eluted from the chromatography column which has been ionised by and transferred from the at least two second ion sources.

Thereby, preferably at least one of this at least one second mass spectrum is obtained with the mass analyser from only the second sample ions obtained from the respective stream of chromatographically separated shares of the respective second assay which has been ionised by and transferred from the at least two second ion sources. In an alternative, however, none of the at least one second mass spectrum is obtained with the mass analyser from only the second sample ions obtained from the respective stream of chromatographically separated shares of the respective second assay which has been ionised by and transferred from the at least two second ion sources.

In order to achieve the before described further improved non-targeted analysis of the respective second assay, the apparatus preferably includes at least two second ion sources fluidly coupled to the at least one chromatography column for receiving and ionising to second sample ions the respective the second assay eluting from the chromatography column. In this case, the apparatus furthermore preferably includes a dividing unit for dividing the respective the second assay eluting from the chromatography column into parts, wherein to each one of the at least two second ion sources, another one of the parts is transferrable for ionisation. This dividing unit may simply be a junction in the transfer line from the chromatography column to the at least two second ion sources or may be a controllable dividing unit which can actively control the dividing of the chromatographically separated second assay into the parts.

Alternatively, however, the apparatus only includes one second ion source. In this alternative, in the method as well, only one second ion source is employed.

In case at least two second ion sources are employed, advantageously, for each one of the at least two second ion sources, at least one second mass spectrum is obtained with the mass analyser from the second sample ions obtained from the respective second assay, in particular from the respective one of the parts which has been ionised by and transferred from the respective one of the at least two second ion sources to the mass analyser. This has the advantage that from the resulting at least two second mass spectra from the second sample ions obtained from the at least two parts of the chromatographically separated sample which have been ionised by and transferred from the respective one of the at least two second ion sources, a more detailed non-targeted analysis of the sample is enabled.

Thereby, preferably at least one of this at least one second mass spectrum is obtained with the mass analyser from only the second sample ions obtained from the respective second assay which has been ionised by and transferred from the respective one of the at least two second ion sources. This has the advantage that an even more detailed non-targeted analysis of the sample is enabled. In an alternative, however, none of the at least one second mass spectrum is obtained with the mass analyser from only the second sample ions obtained from the respective second assay which has been ionised by and transferred from the respective one of the at least two second ion sources.

Alternatively, not for each one of the at least two second ion sources, at least one second mass spectrum is obtained with the mass analyser from the second sample ions obtained from the respective second assay. In an example of such an alternative, for two of the at least two second ion sources, at least one second mass spectrum is obtained with the mass analyser from the second sample ions obtained from the respective second assay by being ionised by and transferred from the respective two of the at least two second ion sources to the mass analyser.

Advantageously, each one of the at least one second mass spectrum is assigned to the respective one of the at least one or of the at least two second ion sources with which the respective second assay has been ionised to the second sample ions from which the respective one of the at least one second mass spectrum has been obtained. This has the advantage, that a more precise knowledge about the respective second assay can be obtained. Alternatively, however, the at least one second mass spectrum is not assigned to a particular one of at least one or at least two second ion sources.

The first ion source can be a pulsed ion source which generates the first sample ions in a pulsed manner or can be a continuous ion source which generates the first sample ions continuously. Independent of whether the first ion source is a pulsed ion source or whether the first ion source is a continuous ion source, the first sample ions are advantageously transferred to the mass analyser in bunches for obtaining the at least one first mass spectrum. Thereby, advantageously, the first sample ions generated by the first ion source are collected in a first ion trap before being transferred in one or more bunches to the mass analyser for obtaining the at least one first mass spectrum. This has the advantage that a more efficient use of the first assay is ensured because a higher rate of first sample ions is transferred to the mass analyser and mass analysed. In this case, the apparatus preferably includes the first ion trap. In a variant however, the first sample ions are transferred past any (first) ion trap and/or continuously to the mass analyser for obtaining the at least one first mass spectrum.

Each one of the at least one or at least two second ion sources can be a pulsed ion source which generates the second sample ions in a pulsed manner or can be a continuous ion source which generates the second sample ions continuously. Independent of whether the respective one of the at least one or the at least two ion sources is a pulsed ion source or whether the respective one of the at least one or the at least two ion sources is a continuous ion source, the second sample ions are advantageously transferred to the mass analyser in bunches for obtaining the at least one second mass spectrum. Thereby, advantageously, the second sample ions generated by the respective one of the at least one or the at least two ion sources are collected in at least one second ion trap before being transferred in one or more bunches to the mass analyser for obtaining the at least one second mass spectrum. This has the advantage that a more efficient use of the second assay is ensured because a higher rate of second sample ions is transferred to the mass analyser and mass analysed. In this case, the apparatus preferably includes the second ion trap. Particular advantageous, to each one of the at least one or at least two second ion sources, another one of the at least one second ion trap is assigned for collecting the second sample ions ionised by the respective one of the at least one or at least two second ion sources. Thus, preferably a same number of second ion traps as number of at least two second ion sources is employed. This has the advantage that a more efficient and more detailed non-targeted analysis of the sample is enabled. In this case, the apparatus preferably includes a same number of second ion traps as number of at least at least two second ion sources. In a variant however, second sample ions which have been ionised by different ones of the at least two second ion sources are collected in a same second ion trap. In another variant however, the second sample ions are transferred past any (second) ion trap and/or continuously to the mass analyser for obtaining the at least one first mass spectrum.

Advantageously, while obtaining one or more of the at least one second mass spectrum with the mass analyser from the second sample ions obtained from the respective second assay and ionised by and transferred from one of the at least one or the at least two second ion sources, one or more first assays are ionised by the first ion source to first sample ions, wherein the thereby obtained first sample ions are collected in the first ion trap for being transferred to the mass analyser after the respective one or more of the at least one second mass spectrum has been obtained with the mass analyser from the second sample ions obtained from the respective second assay, wherein after the respective one or more of the at least one second mass spectrum has been obtained with the mass analyser from the second sample ions obtained from the respective second assay, the first sample ions collected while the respective one or more of the at least one second mass spectrum has been obtained with the mass analyser from the second sample ions obtained from the respective second assay are transferred to the mass analyser with possibly simultaneously ionised further first sample ions for obtaining the respective at least first mass spectrum with the mass analyser from the respective first sample ions. Thereby, in case two or more second mass spectra are obtained with the mass analyser from the second sample ions obtained from the same respective second assay and ionised by and transferred from one of the at least one or at least two second ion sources, between obtaining two of these two or more second mass spectra, advantageously one or more first mass spectrum is obtained from first sample ions that have been collected while the immediately beforehand obtained one or more second mass spectrum has been obtained. In a preferred variant, however, in case two or more second mass spectra are obtained with the mass analyser from the second sample ions obtained from the same respective second assay and ionised by and transferred from one of the at least one or at least two the second ion sources, these two or more second mass spectra are obtained in direct succession, whereafter one or more first mass spectrum is obtained from the first sample ions that have been collected while the immediately beforehand obtained two or more second mass spectra have been obtained. This has the advantage, that a particular efficient analysis of the sample is enabled.

Advantageously, while obtaining one or more of the at least one second mass spectrum with the mass analyser from only the second sample ions obtained from the respective second assay and ionised by and transferred from one of the at least one or the at least two second ion sources, one or more first assays are ionised by the first ion source to first sample ions, wherein the thereby obtained first sample ions are collected in the first ion trap for being transferred to the mass analyser after the respective one or more of the at least one second mass spectrum has been obtained with the mass analyser from only the second sample ions obtained from the respective second assay, wherein after the respective one or more of the at least one second mass spectrum has been obtained with the mass analyser from only the second sample ions obtained from the respective second assay, the first sample ions collected while the respective one or more of the at least one second mass spectrum has been obtained with the mass analyser from the second sample ions obtained from the respective second assay are transferred to the mass analyser with possibly simultaneously ionised further first sample ions for obtaining the respective at least first mass spectrum with the mass analyser from the respective first sample ions, in particular from only the respective first sample ions. Thereby, in case two or more second mass spectra are obtained with the mass analyser from only the second sample ions obtained from the same respective second assay and ionised by and transferred from one of the at least one or at least two second ion sources, between obtaining two of these two or more second mass spectra, advantageously one or more first mass spectrum is obtained from the first sample ions, in particular from only the first sample ions, that have been collected while the immediately beforehand obtained one or more second mass spectrum has been obtained. In a preferred variant, however, in case two or more second mass spectra are obtained with the mass analyser from only the second sample ions obtained from the same respective second assay and ionised by and transferred from one of the at least one or the at least two second ion sources, these two or more second mass spectra are obtained in direct succession, whereafter one or more first mass spectrum is obtained from the first sample ions, in particular only the first sample ions, that have been collected while the immediately beforehand obtained two or more second mass spectra have been obtained. This has the advantage, that a particular efficient and detailed analysis of the sample is enabled.

Alternatively, however, the method may go without such a collecting of first sample ions while obtaining one or more of the at least one second mass spectrum.

Independent of whether the method goes with or without such a collecting of first sample ions while obtaining one or more of the at least one second mass spectrum, advantageously, while obtaining one or more of the at least one first mass spectrum with the mass analyser from the first sample ions obtained from the respective first assay and ionised by and transferred from the first ion source, one or more second assays eluted from the chromatography column and transferred to the at least one or the at least two second ion sources are ionised by the respective one of the at least one or the at least two second ion sources to second sample ions, wherein the thereby obtained second sample ions are collected in the one or more second ion traps for being transferred to the mass analyser after the respective one or more of the at least one first mass spectrum has been obtained with the mass analyser from the first sample ions obtained from the respective first assay, wherein after the respective one or more of the at least one first mass spectrum has been obtained with the mass analyser from the first sample ions obtained from the respective first assay, at least the second sample ions collected with one of the one or more second ion traps while the respective at least one first mass spectrum has been obtained with the mass analyser from the first sample ions obtained from the respective first assay are transferred to the mass analyser with possibly simultaneously ionised further second sample ions ionised by the respective one of the at least one or at least second ion sources for obtaining the respective at least second mass spectrum with the mass analyser from the respective second sample ions. Thereby, in case two or more first mass spectra are obtained with the mass analyser from the first sample ions obtained from the same respective first assay and ionised by and transferred from the first ion source, between obtaining two of these two or more first mass spectra, advantageously one or more second mass spectrum is obtained from second sample ions that have been collected with one of the one or more second ion traps while the immediately beforehand obtained one or more first mass spectrum has been obtained. In a preferred variant, however, in case two or more first mass spectra are obtained with the mass analyser from the first sample ions obtained from the same respective first assay and ionised by and transferred from the first ion source, these two or more first mass spectra are obtained in direct succession, whereafter one or more second mass spectrum is obtained from second sample ions that have been collected with one of the one or more second ion traps while the immediately beforehand obtained two or more first mass spectra have been obtained. In case the at least one second ion source are at least two second ion sources, the above described collected second sample ions are advantageously collected for each one of the at least two second ions sources in that the second sample ions which have been ionised by the respective one of the at least two second ion sources are collected in a different second ion trap. Thus advantageously, to each one of the at least one or the at least two second ion sources, another second ion trap is assigned for collecting the second sample ions ionised by the respective one of the at least one or the at least two second ion sources. In a variant however, second sample ions which have been ionised by a different one of the at least two second ion sources are collected in a same second ion trap. This has the advantage, that a particular efficient analysis of the sample is enabled.

Advantageously, while obtaining one or more of the at least one first mass spectrum with the mass analyser from only the first sample ions obtained from the respective first assay and ionised by and transferred from the first ion source, one or more second assays eluted from the chromatography column and transferred to the at least one or at least two second ion sources are ionised by the respective one of the at least one or the at least two second ion sources to second sample ions, wherein the thereby obtained second sample ions are collected in the one or more second ion traps for being transferred to the mass analyser after the respective one or more of the at least one first mass spectrum has been obtained with the mass analyser from only the first sample ions obtained from the respective first assay, wherein after the respective one or more of the at least one first mass spectrum has been obtained with the mass analyser from only the first sample ions obtained from the respective first assay, at least the second sample ions collected with one of the one or more second ion traps while the respective at least one first mass spectrum has been obtained with the mass analyser from only the first sample ions obtained from the respective first assay are transferred to the mass analyser with possibly simultaneously ionised further second sample ions ionised by the respective one of the at least one or the at least two second ion sources for obtaining the respective at least second mass spectrum with the mass analyser from only the respective second sample ions. Thereby, in case two or more first mass spectra are obtained with the mass analyser from only the first sample ions obtained from the same respective first assay and ionised by and transferred from the first ion source, between obtaining two of these two or more first mass spectra, advantageously one or more second mass spectrum is obtained from only second sample ions that have been collected with one of the one or more second ion traps while the immediately beforehand obtained one or more first mass spectrum has been obtained. In a preferred variant, however, in case two or more first mass spectra are obtained with the mass analyser from only the first sample ions obtained from the same respective first assay and ionised by and transferred from the first ion source, these two or more first mass spectra are obtained in direct succession, whereafter one or more second mass spectrum is obtained from only second sample ions that have been collected with one of the one or more second ion traps while the immediately beforehand obtained two or more first mass spectra have been obtained. This has the advantage, that a particular efficient and detailed analysis of the sample is enabled.

Alternatively, however, the method may go without such a collecting of second sample ions while obtaining one or more of the at least one first mass spectrum.

Preferably, after being chromatographically separated, as the respective second assay eluting from said chromatography column is transferred to the at least two second ion sources, wherein the respective second assay eluted from the chromatography column is divided into parts, wherein to each one of the at least two second ion sources, another one of the parts transferred, wherein by each one of the at least two second ion sources, the respective one of the parts which is transferred to the respective one of the at least two second ion sources is ionised to the second sample ions, a sequence of second mass spectra is obtained with the mass analyser in that the at least two second ion sources are used in a second ion source sequence having second ion source sequence elements, wherein in each second ion source sequence element, the second sample ions ionised by only one of the at least two second ion sources are transferred to the mass analyser and at least one second mass spectrum is obtained with the mass analyser from only the second sample ions ionised by only the respective one of the at least two second ion sources, wherein the respective one of the at least two second ion sources is assigned to the respective second ion source sequence element, wherein the second ion source sequence includes at least two different second ion source elements, each having a different one of at least two second ion sources being assigned to it. This has the advantage that a quasi-simultaneous non-targeted analysis of the respective second assay is enabled since with the second ion source sequence, mass spectra can be obtained repeatedly from the different second ion sources.

In a first variant, all the second ion source sequence elements of the second ion source sequence differ from each other in having each a different one of at least two second ion sources assigned to it. In a second variant however, the second ion source sequence includes one of the at least two different second ion source elements twice or even more times but separated by another one of the at least two different ion source elements.

Independent of whether the second ion source sequence includes one of the at least two different second ion source elements twice or more times or whether all the second ion source sequence elements of the second ion source sequence differ from each other in having each a different one of at least two second ion sources assigned to it, neighbouring second ion source sequence elements in the second ion source sequence can be arranged gapless adjacent to each other or can be arranged with gaps between them. In case two neighbouring second ion source sequence elements are arranged with a gap between them, the gap is preferably maximally 50 ms long, particular preferably maximally 40 ms long, most preferably maximally 40 ms long. In a variant however, the gap is more than 50 ms long. Independent of the length of the gap, advantageously, the gap is used to switch from the one of the at least two second ion sources which is used in the second ion source sequence element before the gap to the one of the at least two second ion sources which is used in second ion source sequence element after the gap. During the gap, no mass spectrum may be obtained with the mass analyser, one or more further second mass spectra may be obtained with the mass analyser from second sample ions ionised by one or two or more different ones of the at least two second ion sources or at least one first mass spectrum may be obtained with the mass analyser from first sample ions.

Advantageously, the second ion source sequence is repeated at a frequency of more than 3 Hz, particular preferably more than 5 Hz. Alternatively, however, the second ion source sequence is repeated at a frequency of 3 Hz less.

In a variant, the second sample ions ionised by the different at least two second ion sources are multiplexed for mass analysis. In this variant, the second sample ions are transferred to the mass analyser modulated according to modulation functions. Thereby, for each second ion source, advantageously, the second sample ions are modulated according to a different modulation function. Thereby, the different modulation functions each provide an autocorrelation which provides one single peak at one position and a constant value at all other positions, while the cross correlation between the different modulation functions is zero. For obtaining the second mass spectrum of the second sample ions ionised by one of the two second ion sources, the correlation of the mass analyser signal with the modulation function applied to the respective second sample ions is calculated. And for obtaining the second mass spectrum of the second sample ions ionised by the other one of the two second ion sources, the correlation of the mass analyser signal with the modulation function applied to the respective second sample ions is calculated. How such a multiplexing is obtained is for example explained in great detail in EP 3 309 816 B1 of Tofwerk AG. In another variant however, such a multiplexing is omitted.

Advantageously, as the respective second assay eluting from the chromatography column is transferred to the at least one or the at least two second ion sources and ionised by the at least one or the at least two second ion sources to the second sample ions, an overall sequence of first and second mass spectra is obtained with the mass analyser in that the first ion source and the at least one or the at least two second ion sources are used in an overall sequence having overall sequence elements, wherein in a first overall sequence element of the overall sequence, the first sample ions obtained from the respective first assay are transferred to the mass analyser and at least one first mass spectrum is obtained with the mass analyser from only the first sample ions obtained from the respective first assay and ionised by and transferred from the first ion source, and in a second overall sequence element of the overall sequence, the second sample ions obtained from the respective second assay are transferred to the mass analyser and at least one second mass spectrum is obtained with the mass analyser from only the second sample ions obtained from the respective the second assay which has been ionised by and transferred from the respective at least one or the respective at least two second ion source. This has the advantage that a quasi-simultaneous targeted and non-targeted analysis of the sample is enabled since with the overall sequence, mass spectra can be obtained repeatedly from first and second assays of the sample.

In case after being chromatographically separated, the respective second assay eluting from the chromatography column is transferred to the at least two second ion sources, wherein the respective second assay eluted from the chromatography column is divided into parts, wherein to each one of the at least two second ion sources, another one of the parts transferred, wherein by each one of the at least two second ion sources, the respective one of the parts which is transferred to the respective one of the at least two second ion sources is ionised to the second sample ions, and in case for each one of the at least two second ion sources, at least one second mass spectrum is obtained with the mass analyser from the second sample ions obtained from the respective one of the parts which has been ionised by and transferred from the respective one of the at least two second ion sources to said mass analyser, then, advantageously, the overall sequence includes a same number of second overall sequence elements as a number of the parts which are transferred to their respective one of the at least two second ion sources and are ionised to the second sample ions, wherein in each second overall sequence element, the second sample ions ionised by only one of the at least two second ion sources are transferred to the mass analyser and at least one second mass spectrum is obtained with the mass analyser from only the second sample ions ionised by only the respective one of the at least two second ion sources, wherein the respective one of the at least two second ion sources is assigned to the respective second overall sequence element, wherein the overall sequence includes at least two different second ion source elements, each having a different one of at least two second ion sources being assigned to it. This has the advantage that a quasi-simultaneous targeted and a further improved non-targeted analysis of the sample is enabled since with the overall sequence, mass spectra can be obtained repeatedly from first and second assays of the sample.

Independent of whether the overall sequence includes one or more different second overall elements, whenever a first overall sequence element follows a second overall sequence element, the respective first overall sequence element can be arranged gapless after the respective second overall sequence element or can be arranged with a gap after the respective second overall sequence element. Similarly, whenever a second overall sequence element follows a first overall sequence element, the respective second overall sequence element can be arranged gapless after the respective first overall sequence element or can be arranged with a gap after the respective first overall sequence element. In either case, the gap is preferably maximally 15 ms long, particular preferably maximally 10 ms long, most preferably maximally 5 ms long. In a variant however, the gap is more than 15 ms long. Independent of the length of the gap, advantageously, the gap is used to switch from the ion source which is used in the element before the gap to the ion source which is used in second ion source sequence element after the gap. During the gap, no mass spectrum may be obtained with the mass analyser, one or more further second mass spectra may be obtained with the mass analyser from second sample ions ionised by one or two or more different ones of the at least two second ion sources or at least one first mass spectrum may be obtained with the mass analyser from first sample ions.

Advantageously, the overall sequence is repeated at a frequency of more than 3 Hz, particular preferably more than 5 Hz, more preferably more than 50 Hz, most preferably more than 100 Hz. Alternatively, however, the overall sequence is repeated at a frequency of 3 Hz less.

Alternatively to these variants, however, no such overall sequence of first and second mass spectra is obtained with the mass analyser.

In a variant, the first sample ions ionised by the first ion source and the second sample ions ionised by the different at least two second ion sources are multiplexed for mass analysis. In this variant, the first sample ions and the second sample ions are transferred to the mass analyser modulated according to modulation functions. Thereby, for the first ion source and for each second ion source, advantageously, the first and second sample ions, respectively, are modulated according to a different modulation function. Thereby, the different modulation functions each provide an autocorrelation which provides one single peak at one position and a constant value at all other positions, while the cross correlation between the different modulation functions is zero. For obtaining the first mass spectrum, the correlation of the mass analyser signal with the modulation function applied to the first sample ions is calculated. Furthermore for obtaining the second mass spectrum of the second sample ions ionised by one of the two second ion sources, the correlation of the mass analyser signal with the modulation function applied to the respective second sample ions is calculated. And for obtaining the second mass spectrum of the second sample ions ionised by the other one of the two second ion sources, the correlation of the mass analyser signal with the modulation function applied to the respective second sample ions is calculated. How such a multiplexing is obtained is for example explained in great detail in EP 3 309 816 B1 of Tofwerk AG. In another variant however, such a multiplexing is omitted.

Advantageously, the first ion source is separate from the at least one or the at least two second ion sources and is thus neither one and the same ion source as any one of the at least one or the at least two second ion sources nor together with any one of the at least one or the at least two second ion sources part of one physical ion source providing two different ionisation units in a same chamber. This has the advantage that the first assay and the second assay can be mass analysed more easily quantitatively because no intermixture of first assays and second assays occurs during ionisation.

Alternatively, however the first ion source is combined with one or more of the at least one or the at least two second ion sources.

Preferably, the first ion source is a chemical ionisation ion source. This has the advantage that a soft ionisation of the first assays can be obtained, leading to less fragmentation of the compounds of the first assays, thus, enabling a more precise targeted mass analysis of the first assay.

Alternatively, however, the first ion source is another type of ion source. In one example, the first ion source is an electron ionisation ion source. In another example, the first ion source is an electrospray ionisation ion source. In yet another example, the first ion source is a gas discharge ion source. In yet another example, the first ion source is a photoionisation ion source.

Preferably, one of said at least one or the at least two second ion sources is a chemical ionisation ion source. This has the advantage that a soft ionisation of the chromatographically separated second assays can be obtained with the chemical ionisation ion source, leading to less fragmentation of the compounds of the chromatographically separated second assays, thus, enabling a mass analysis of the unfragmented compounds of the chromatographically separated second assays.

In case the first ion source is a chemical ionisation ion source and one of the at least one or the at least two second ion sources is a chemical ionisation ion source, the first ion source and the one of the at least one or the at least two second ion sources are preferably of the same type of chemical ionisation ion source, particular preferably physically one and the same chemical ionisation source. This has the advantage, that the apparatus can be constructed less cost intensive and thus that the method can be employed with less costs. In a preferred variant thereof, however, the first ion source and the one of the at least one second ion source are of the different types of chemical ionisation ion source.

Advantageously, the at least one of the at least one or the at least two second ion sources is an electron ionisation ion source. This enables ionisation with a hard ionisation method and has thus the advantage that the chromatographically separated second assays can be ionised with extensive fragmentation, which is helpful for structure determination of unknown compounds. Thus, a mass analysis of the fragmented compounds of the chromatographically separated second assays is enabled.

Particular advantageous, one of the at least two second ion sources is a chemical ionisation ion source and another one of the at least two second ion sources is an electron ionisation ion source. This has the advantage that mass analysis of the unfragmented and of the fragmented compounds of the chromatographically separated second assays is enabled.

Alternatively, however, none of the at least one second ion source is a chemical ionisation ion source or an electron ionisation ion source.

In one example, one of the least one second ion source is an electron ionisation ion source. In another example, one of the least one second ion source is an electrospray ionisation ion source. In yet another example, one of the least one second ion source is a gas discharge ion source. In yet another example, the first ion source is a photoionisation ion source.

In case the at least one second ion source are two second ion sources, in a first variant, the chromatography column includes at least two parallel switched chromatography columns, wherein the respective second assay is divided and fed to the different at least two parallel switched chromatography columns, wherein from each of the at least two parallel switched chromatography columns, the respective eluting share of chromatographically separated second assay is fed to another one of the at least two second ion sources for being ionised to second sample ions. This has the advantage that the chromatography columns and their corresponding one of the at least two second ion sources can be matched to each other for obtaining an optimised non-targeted analysis of the second assays.

In a second variant, however, the chromatography column does not include parallel chromatography columns. In this variant, the chromatography column may be one single chromatography column or may include two or more chromatography columns that are switched in series and thus after each other.

Preferably, the chromatography column includes a liquid chromatography column. This has the advantage that the second assays are separated by liquid chromatography. Alternatively, however, the chromatography column does not include any liquid chromatography column.

Advantageously, the chromatography column includes a gas chromatography column. This has the advantage that the second assays are separated by gas chromatography. In a preferred variant, the chromatography column includes a liquid chromatography column and a gas chromatography column switched in series. This enables a better chromatographic separation of the second assay. In another preferred variant, however, the chromatography column includes only a liquid chromatography column or only a gas chromatography column and is thus a liquid chromatography column or a gas chromatography column, respectively.

In case the chromatography column includes a gas chromatography column, preferably, a carrier gas is used to pass the respective second assay through the gas chromatography column. Thereby, the carrier gas is preferably one of Helium, Hydrogen and Nitrogen. In a variant however, the carrier gas is another carrier gas than Helium, Hydrogen and Nitrogen.

Independent of the type of carrier gas, a flow of the carrier gas is preferably in a range from 0.1 sccm to 100 sccm. Particular preferably, the flow of the carrier gas is in a range from 0.1 sccm to 25 sccm. Most preferably, the flow of the carrier gas is in a range from 0.1 sccm to 7 sccm. In another variant, however, the flow of the carrier gas is below 0.1 sccm or above 100 sccm. Thereby, in the present text, the units "sccm" are standard cubic centimeters per minute at a temperature of 298.15 K and 101.300 kPa pressure.

Alternatively, no carrier gas is used to pass the respective second assay through the gas chromatography column.

In a first preferred variant, whenever the respective second assay is transferred for chromatographic separation via the gas chromatography column to the at least one or the at least second ion source, passing the entire respective second assay through the gas chromatography column for chromatographic separation takes at least 1 minute, particular preferably at least 5 minutes. In a second preferred variant, whenever the respective second assay is transferred for chromatographic separation via the gas chromatography column to the at least one or the at least two second ion source, passing the entire respective second assay through the gas chromatography column for chromatographic separation takes at least 15 minutes, particular preferably between 15 minutes and 35 minutes, most preferably between 20 minutes and 30 minutes. In a third preferred variant, whenever the respective second assay is transferred for chromatographic separation via the gas chromatography column to said at least one or the at least two second ion source, passing the entire respective second assay through the gas chromatography column for chromatographic separation takes less than 5 minutes, particular preferably less than 1 minute.

In an alternatively to these variants, the chromatography column does not include any gas chromatography column.

Advantageously, the apparatus includes a controller adapted for controlling the apparatus for executing the method according to the invention, in particular for controlling the first ion source, the chromatography column, the at least one second ion source or the at least two second ion sources, respectively, the mass spectrum acquisition arrangement, the assignment module and the mass analyser. In case the apparatus includes the first ion trap, the controller is advantageously as well adapted for controlling the first ion trap. In case the apparatus includes one or more second ion traps, the controller is advantageously as well adapted for controlling the one or more second ion traps. In case the apparatus includes the dividing unit which is controllable, the controller is advantageously as well adapted for controlling the dividing unit.

Alternatively, however, the apparatus goes without such a controller.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

Preferred Embodiments

Figure 1:
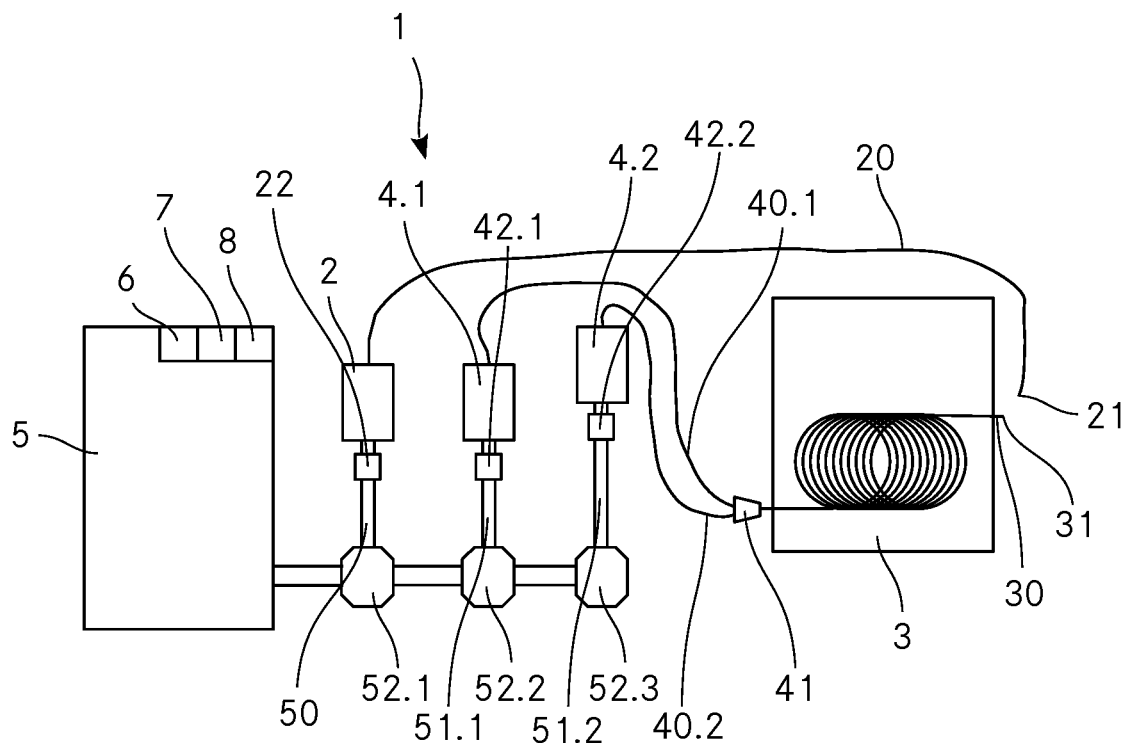
FIG. 1 a simplified schematic view of an apparatus according to the invention for mass analysing a sample with the method according to the invention, FIG. 2 a float chart of the method as employed with the apparatus shown in FIG. 1, FIG. 3 a simplified schematic view of another apparatus according to the invention for mass analysing a sample with the method according to the invention, FIG. 4 a simplified schematic view of another apparatus according to the invention for mass analysing a sample with the method according to the invention, and FIG. 5 a simplified schematic view of yet another apparatus according to the invention for mass analysing a sample with the method according to the invention.

FIG. 1 shows a simplified schematic view of an apparatus 1 according to the invention for mass analysing a sample with the method according to the invention. Based on this figure, not only the apparatus 1 is explained, but also the method according to the invention, for mass analysing a sample by ionising the sample to first sample ions and to second sample ions and by obtaining mass spectra from the first sample ions and the second sample ions with a mass analyser 5, is illustrated.

The apparatus 1 includes a first ion source 2 for repeatedly receiving a first assay obtained from the sample and for ionising the respective first assay to first sample ions. This first ion source 2 is a chemical ionisation ion source. In other examples, however, the first ion source is another ion source than a chemical ionisation ion source. Independent of the type of ion source, the first ion source 2 is connected via a first assay transfer line 20 with a first assay inlet 21 for obtaining and inserting first assays from the sample into the apparatus 1. In case the sample is contained in a container, then the first assay inlet 21 can be connected to this container. In case the sample is however not contained in a container, then the first assay inlet 21 can be a simple opening to an outside of the apparatus 1 or a valve to the outside of the apparatus 1. In one example of such a sample which is not contained in a container, the sample is ambient air.

The apparatus 1 further includes a chromatography column 3 for receiving at least once a second assay for chromatographically separating the respective second assay by passing the respective second assay through the chromatography column 3, wherein the respective second assay has been obtained from the sample within a time window associated with the respective second assay, the time window having a window width. This chromatography column 3 is a gas chromatography column. In use, the chromatography column 3 being a gas chromatography column is operated with using Helium as carrier gas to pass the respective second assay through the chromatography column. In other variants, however, the carrier gas is Hydrogen, Nitrogen or another carrier gas. Independent of the type of carrier gas, a flow of the carrier gas is in a range from 0.1 sccm to 100 sccm. In a preferred variant, however, the flow of the carrier gas is in a range from 0.1 sccm to 25 sccm. In another preferred variant, the flow of the carrier gas is in a range from 0.1 sccm to 7 sccm. Nonetheless, it is as well possible that the flow of the carrier gas is below 0.1 sccm or above 100 sccm. The chromatography column 3 is designed such that chromatically separating one second assay takes 20 minutes to 30 minutes. In another example, the chromatography column 3 is designed to take 1 minute to 5 minutes for chromatically separating one second assay. In yet other examples, the chromatography column 3 is designed to take less than one minute or more than 30 minutes for chromatically separating one second assay.

The chromatography column 3 is fluidly connected via a second assay transfer line 30 with a second assay inlet 31 for obtaining and inserting second assays from the sample into the apparatus 1. In case the sample is contained in a container, then the second assay inlet 31 can be connected to this container. In case the sample is however not contained in a container, then the second assay inlet 31 can be a simple opening to an outside of the apparatus 1 or a valve to the outside of the apparatus 1. In one example of such a sample which is not contained in a container, the sample is ambient air.

In the apparatus 1 shown in FIG. 1, the first assay inlet 21 and the second assay inlet 31 are separate inlets. In a variant, however, the first assay inlet 21 and the second assay inlet 31 are combined in one and the same inlet, like for example shown in FIG. 4.

The apparatus 1 further includes two second ion sources 4.1, 4.2 fluidly coupled to the chromatography column 3 for receiving and ionising to second sample ions the respective second assay eluting from the chromatography column 3. Thus, the two second ion sources 4.1, 4.2 are connected via second assay transfer lines 40.1, 40.2 with the chromatography column 3. Thereby, the second assay transfer lines 40.1, 40.2 are connected with a dividing unit 41 which is arranged right after the chromatography column 3. This dividing unit 41 is for dividing the respective chromatographically separated second assay eluting from the chromatography column 3 into two parts, wherein to each one of the two second ion sources 4.1, 4.2 another one of the two parts is transferrable via the respective second assay transfer line 40.1, 40.2 for ionisation. In the present example, the dividing unit 41 is simply a junction in the transfer line from the chromatography column 3 to the two second ion sources 4.1, 4.2 which splits the transfer line into the two second assay transfer lines 40.1, 40.2. In a variant however, the dividing unit is a controllable and thus an actively switchable dividing unit for controlling when what amount of the respective chromatographically second assay eluting from the chromatography column is transferred to which one of the two second ion sources 4.1, 4.2.

In the present example, a first one of the two second ionisation sources 4.1 is a chemical ionisation source, while a second one of the two second ionisation sources 4.2 is an electron ionisation ion source. In other examples, however, the second ion sources are other types of ion sources. In an example, both second ion sources are chemical ionisation ion sources. In another example, one of the second ion sources is an electrospray ionisation ion source, while the other one of the second ion sources is a laser ablation ion source or a gas discharge ionisation ion source.

The apparatus 1 furthermore includes the mass analyser 5 which is a time of flight mass analyser. The mass analyser 5 is fluidly coupled to the first ion source 2 by a first sample ion transfer line 50 for receiving the first sample ions obtained from the respective first assay and for obtaining at least one first mass spectrum signal with the mass analyser 5 from the first sample ions obtained from the respective first assay for obtaining the at least one first mass spectrum and ionised by and received from the first ion source 2. This mass analyser 5 is additionally fluidly coupled by second sample ion transfer lines 51.1, 51.2 to the two second ion sources 4.1, 4.2 for receiving the second sample ions and for obtaining at least one second mass spectrum signal from the second sample ions obtained from the respective second assay which has been ionised by and received from the two second ion sources 4.1, 4.2 for obtaining the at least one second mass spectrum. Thereby, in the present example, the second sample ion transfer lines 51.1, 51.2 and the first sample ion transfer line 50 start at their respective first ion source 2 or second ion source 4.1, 4.2 and are merged via switchable ion benders 52.1, 52.2, 52.3 to one single line leading to the mass analyser 5. These switchable ion benders 52.1, 52.2, 52.3 enable controlling which sample ions from which first or second ion source 2, 4.1, 4.2 are when transferred to the mass analyser 5 for being mass analysed.

The apparatus 1 additionally includes a first ion trap 22 arranged right after the first ion source 2 for collecting the first sample ions ionised by the first ion source 2 before transferring the first sample ions in one or more bunches to the mass analyser 5 for obtaining the at least one first mass spectrum. Similarly, the apparatus 1 includes two second ion traps 42.1, 42.2, each arranged right after another one of the two second ion sources 4.1, 4.2 for collecting the second sample ions ionised by the respective one of the two second ion sources 4.1, 4.2 before transferring the second sample ions in one or more bunches to the mass analyser 5 for obtaining the at least one second mass spectrum.

The apparatus 1 furthermore includes a mass spectrum acquisition arrangement 6 for obtaining at least one first mass spectrum from the at least one first mass spectrum signal and for obtaining at least one second mass spectrum from the at least one second mass spectrum signal. Additionally, the apparatus 1 includes an assignment module 7 for assigning each one of the at least one second mass spectrum to one or more of the at least one first mass spectrum from the first sample ions obtained from one of the first assays which has been obtained from the sample within the time window associated with the respective second assay which has been chromatographically separated and ionised by one of the two or both second ion sources 4.1, 4.2 to the second sample ions from which the respective one of the at least one second mass spectrum has been obtained.

Furthermore, the apparatus 1 includes a controller 8 adapted for controlling the apparatus 1 for executing the method according to the invention. This controller 8 is for controlling the first ion source 2, the chromatography column 3, the two second ion sources 4.1, 4.2, the mass spectrum acquisition arrangement 6, the assignment module 7 and the mass analyser 5. The controller 8 is as well adapted for controlling the first ion trap 22 and the two second ion traps 42.1, 42.2.

Figure 2:
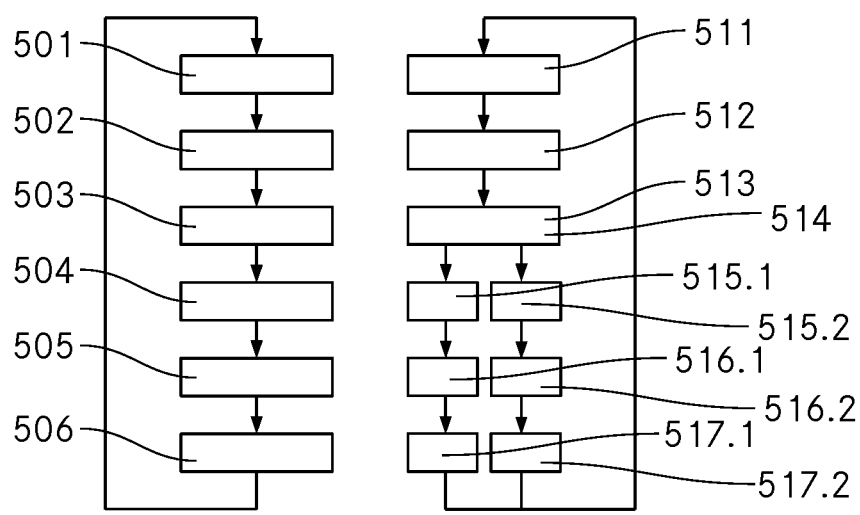

As already mentioned, the method according to the invention is illustrated on the basis of the apparatus 1 shown in FIG. 1. For further illustration purposes, a float chart of this example of the method is shown in FIG. 2. Thereby, reference numbers referring to elements of the method shown in the float chart in FIG. 2 are provided in the following text. These reference numbers are numbers above 500. Thus, the following description of the method provides an example of how the method according to the invention can be implemented. Nonetheless, many other ways of implementing the method are available, too.

In the on the basis of the in FIG. 1 shown apparatus 1 illustrated example of the method, repeatedly, a first assay is obtained from the sample 501, transferred 502 past any chromatography column and thus directly without any chromatographic separation to the first ion source 2 and ionised 503 by the first ion source 2 to the first sample ions. These first sample ions ionised by the first ion source 2 are collected 504 in the first ion trap 22 before being transferred in one bunch to the mass analyser 5 for obtaining one first mass spectrum. Thus, ultimately, the first sample ions obtained from the respective first assay are transferred 505 to the mass analyser 5, wherein one first mass spectrum is obtained 506 with the mass analyser 5 from only the first sample ions obtained from the respective first assay and ionised by and transferred from the first ion source 2. Furthermore, repeatedly, a second assay is obtained 511 from the sample, each time within a time window being associated with the respective second assay and having a window width. This window width is 1 second. In another example, the window width is 10 seconds. In yet another example, the window width is 59 seconds. In yet another example, the window width is 4 minutes.

Independent of the choice of the window width, in each repetition, the respective second assay is preconcentrated 512 after being obtained from the sample and before being transferred 513 for chromatographic separation via the chromatography column 3 to the two second ion sources 4.1, 4.2. Each respective preconcentrated second assay is then transferred 513 for chromatographic separation via the chromatography column 3 to the two second ion sources 4.1, 4.2 in that after being chromatographically separated, a stream of chromatographically separated shares of the respective second assay eluting from the chromatography column 3 is divided 514 by the dividing unit 41 into two parts, wherein to each one of the two second ion sources 4.1, 4.2, another one of the two parts is transferred, wherein by each one of the two second ion sources 4.1, 4.2, the respective one of the parts which is transferred to the respective one of the two second ion sources 4.1, 4.2 is ionised 515.1, 515.2 to the second sample ions, wherein the second sample ions obtained from the respective stream of chromatographically separated shares of the respective second assay are transferred 516.1, 516.2 to the mass analyser 5. Thereby, for each one of the two second ion sources 4.1, 4.2, the respective stream of chromatographically separated shares of the second sample ions is transferred 516.1, 516.2 to the mass analyser 5 in a time evolution corresponding to a time evolution of the stream of chromatographically separated shares of the respective second assay eluting from the chromatography column 3, wherein for each one of the two second ion sources 4.1, 4.2, successively, twenty second mass spectra are obtained 517.1, 517.2 with the mass analyser 5 from only second sample ions of the stream of chromatographically separated shares of the second sample ions from the respective one of the two second ion sources 4.1, 4.2 for accessing information about a time dependent evolution of constituent parts of the stream of chromatographically separated shares of the respective second assay in the in total forty second mass spectra. Thereby, each one of the in total forty second mass spectra is assigned to the respective one of the two second ion sources 4.1, 4.2 with which the second sample ions have been ionised from which the respective second mass spectrum has been obtained. Furthermore, each one of the in total forty second mass spectra is assigned by the assignment module 7 to the first mass spectrum from the first sample ions obtained from the first assay which has been obtained from the sample just before the respective second assay has been obtained from the sample from which second assay the respective total forty mass spectra have been obtained. Thus, each one of the in total forty second mass spectra is assigned by the assignment module 7 to the first mass spectrum which has been obtained from the sample within the time window associated with the respective second assay which has been chromatographically separated and ionised by the two second ion sources 4.1, 4.2 to the second sample ions from which the respective one of the in total forty second mass spectra has been obtained.

In the illustrated method, each first mass spectrum is assigned to the respective first assay which has been ionised by the first ion source 2 to the first sample ions from which the respective first mass spectrum has been obtained. Additionally, however, each one of the in total forty second mass spectra is assigned to the respective second assay which has been ionised by the two second ion sources 4.1, 4.2 to the second sample ions from which the in total forty second mass spectra have been obtained. Furthermore, each one of the in total forty second mass spectra is assigned to the respective one of the two second ion sources 4.1, 4.2 with which the respective second assay has been ionised to the second sample ions from which the respective one of the in total forty second mass spectra has been obtained.

As mentioned already, from each first assay, the first sample ions ionised by the first ion source 2 are collected in the first ion trap 22 before being transferred in one bunch to the mass analyser 5 for obtaining the first mass spectrum. Similarly, the second sample ions generated by the respective one of the two ion sources 4.1, 4.2 of the respective part of the stream of chromatographically separated respective second assay are preliminary collected in the respective one of the two second ion traps 42.1, 42.2 before being transferred in bunches in a time evolution corresponding to the time evolution of the stream of chromatographically separated shares of the respective second assay eluting from the chromatography column 3 to the mass analyser 5 for obtaining the in total forty mass spectra. Thereby, while obtaining for each one of the two second ion sources 4.1, 4.2 one of the second mass spectra with the mass analyser 5 from only the second sample ions obtained from the respective second assay and ionised by and transferred from only the respective one of the two second ion sources 4.1, 4.2, one first assay is ionised by the first ion source 2 to first sample ions, wherein the thereby obtained first sample ions are collected in the first ion trap 22 for being transferred to the mass analyser 5 after the respective two of the second mass spectra have been obtained with the mass analyser 5 from the second sample ions obtained from the respective second assay. After the respective two of the second mass spectra have been obtained with the mass analyser 5, the first sample ions that have been collected in the first ion trap 22 while the respective two second mass spectra have been obtained with the mass analyser 5 are transferred to the mass analyser 5 with possibly simultaneously ionised further first sample ions of the respective first assay for obtaining the first mass spectrum with the mass analyser 5 from only the respective first sample ions of the respective first assay.

Since in total forty second mass spectra are obtained with the mass analyser 5 from the second sample ions obtained from the same respective second assay and ionised by and transferred from the two second ion sources 4.1, 4.2, each time after for each one of the two second ion sources 4.1, 4.2, one second mass spectrum of only the second sample ions ionised by the respective one of the two second ion sources 4.1, 4.2 has been obtained, one first mass spectrum is obtained from first sample ions that have been collected while the immediately beforehand obtained two second mass spectra have been obtained. Thus, during mass analysis of one respective second assay, twenty times two second mass spectra are obtained with the mass analyser 5, wherein each time after obtaining such two second mass spectra, one first mass spectrum of a newly obtained first assay is obtained with the mass analyser. Thereby, over the twenty times in which two second mass spectra followed by one first mass spectra are obtained, in the succession of second mass spectra, the time dependent evolution of the constituent parts of the stream of chromatographically separated shares of the respective second assay is scanned.

In order to have for the mass analysis as many of the second sample ions from the respective second assay availably as possible, for each one of the two second ions sources 4.1, 4.2, the second sample ions which have been ionised by the respective one of the two second ion sources 4.1, 4.2 are collected in a different one of the two second ion traps 41.1, 42.2 before being transferred to the mass analyser 5 in bunches. More precisely, while obtaining one first mass spectrum with the mass analyser 5 from the first sample ions that have been obtained from one first assay and while obtaining one second mass spectrum with the mass analyser 5 from the second sample ions ionised by one of the two second ion sources 4.1, 4.2, the second sample ions ionised by the other one of the two second ion sources 4.2, 4.1 are collected in the respective one of the two second ion traps 42.2, 42.1 and only then transferred to the mass analyser 5, when it is the turn to obtain one second mass spectrum of only the second sample ions ionised with the respective second ion source 4.1, 4.2. Thus, during chromatographic separation of the respective second assay by passing the respective second assay through the chromatography column 3, the stream of chromatographically separated shares of the respective second assay eluting from the chromatography column 3 is divided in two parts and the two parts are each transferred to another one of the two second ion sources 4.1, 4.2 and ionised to second sample ions by the respective one of the two second ion sources 4.1, 4.2. These second sample ions are collected over a short time in the respective second ion trap 42.1, 42.2 before being transferred in bunches to the mass analyser 5. Thus, ultimately, for each one of the second ion sources 4.1, 4.2, the sequence of bunches of second sample ions transferred to the mass analyser 5 has a time evolution corresponding to the time evolution of the stream of chromatographically separated shares of the respective second assay eluting from the chromatography column 3, even though the sequence of bunches of second sample ions is discretised as compared to stream of chromatographically separated shares of the respective second assay eluting from the chromatography column 3.

This organisation of how the first sample ions and the second sample ions are transferred to the mass analyser 5 and of how the respective first and second mass spectra are obtained with the mass analyser 5 provides the following characteristics:

For each one second assay, repeatedly, a sequence of second mass spectra is obtained with the mass analyser 5 in that the two second ion sources 4.1, 4.2 are used in a second ion source sequence having second ion source sequence elements, wherein in each second ion source sequence element, the second sample ions ionised by only one of the two second ion sources 4.1, 4.2 are transferred to the mass analyser 5 and one second mass spectrum is obtained with the mass analyser 5 from only the second sample ions ionised by only the respective one of the two second ion sources 4.1, 4.2. Thereby, the respective one of the two second ion sources 4.1, 4.2 is assigned to the respective second ion source sequence element, wherein the second ion source sequence includes two different second ion source elements, each having a different one of at least two second ion sources 4.1, 4.2 being assigned to it. Thereby, since the second ion traps 42.1, 42.2 and the switchable ion benders 52.1, 52.2, 52.3 have to be switched between the two neighbouring second ion source sequence elements for running the second ion source sequence, there is a gap between the two neighbouring second ion source sequence elements, the gap being 40 ms long. In a variant, the gap is 50 ms long. In other variants, however, the gap differs from 40 ms and 50 ms, respectively.

In the present example, each time between repeating the second ion source sequence, one first mass spectrum is obtained with the mass analyser 5. Thus, the organisation of how the first sample ions and the second sample ions are transferred to the mass analyser 5 and of how the respective first and second mass spectra are obtained with the mass analyser 5 further provides the following characteristics:

For each one second assay, as the respective second assay eluting from the chromatography column 3 is divided into parts, wherein to each one of the two second ion sources 4.1, 4.2, another one of the parts is transferred, wherein by each one of the two second ion sources 4.1, 4.2, the respective one of the parts which is transferred to the respective one of the two second ion sources 4.1, 4.2 is ionised to the second sample ions, and as for each one of the two second ion sources 4.1, 4.2, twenty second mass spectra are obtained with the mass analyser 5 from the second sample ions that have been obtained from the respective one of the parts which has been ionised by and transferred from the respective one of the two second ion sources 4.1, 4.2 to the mass analyser 5. Thereby, a repeated overall sequence of first and second mass spectra is obtained with the mass analyser 5 in that the first ion source 2 and the two second ion sources 4.1, 4.2 are used in an overall sequence having overall sequence elements. Thereby, in a first overall sequence element of the overall sequence, the first sample ions obtained from one first assay are transferred to the mass analyser 5 and one first mass spectrum is obtained with the mass analyser 5 from only the first sample ions obtained from the respective first assay and ionised by and transferred from the first ion source 2. Furthermore, the overall sequence includes two second overall sequence elements which are arranged in the overall sequence before the first overall sequence element. In each of these two second overall sequence elements, the second sample ions ionised by only one of the two second ion sources 4.1, 4.2 are transferred to the mass analyser 5 and one second mass spectrum is obtained with the mass analyser 5 from only the second sample ions ionised by only the respective one of the two second ion sources 4.1, 4.2. Thereby, the respective one of the two second ion sources 4.1, 4.2 is assigned to the respective second overall sequence element, wherein the two second ion source elements differ from each one in that each has a different one of the two second ion sources 4.1, 4.2 being assigned to it.

In this overall sequence, the two second overall sequence elements are at the same time the above mentioned second ion source sequence elements and form together the above mentioned second ion source sequence. Thus, the overall sequence is formed by the second ion source sequence followed by the first overall sequence element after a gap of 10 ms because one of the second ion traps 42.2 and the switchable ion benders 52.1, 52.2, 52.3 have to be switched between the second one of the two second overall sequence elements and the first overall sequence element. In a variant however, this gap is 15 ms long. In yet another variant, this gap is 50 ms long. Similarly, when repeating the overall sequence, there is the same gap between the first overall sequence element of the finishing pass of the overall sequence and the first one of the two second overall sequence elements of the repeated pass of the overall sequence.

In this picture, in the present example, whenever one second assay is obtained from the sample, the overall sequence is repeated and thus run in total twenty times for mass analysing the chromatographically separated second assay while at the same time, twenty first assays are obtained from the sample and mass analysed. The second mass spectra obtained during these twenty times the overall sequence is run, however, are assigned to the mass spectrum of the first assay obtained from the sample just before the respective second assay has been obtained from the sample. Thus, the method enables a targeted mass analysis of the sample over time by obtaining repeatedly a first assay from the sample and mass analysing the first assay by obtaining one first mass spectrum. At the same time, the method enables a non-targeted mass analysis of the sample whenever desired by obtaining one second assay, chromatographically separating the second assay and obtaining several second mass spectra from the chromatographically separated second assay. Thereby, the second mass spectra are assigned to the first mass spectrum of the first assay obtained from the sample just before the respective second assay has been obtained from the sample and not to the first mass spectra obtained between obtaining the second mass spectra. Thus, the non-targeted mass analysis of the sample does not hamper the targeted mass analysis of the sample over time.

In the above described example of the method, repeatedly, one second assay is obtained from the sample and mass analysed. This repetition may be periodically. On the other hand, one second assay can also be obtained from the sample and mass analysed whenever a particular feature appears in one obtained first mass spectrum. Thus, in one example, every 10 seconds, a first assay is obtained from the sample and one first mass spectrum is obtained from the first sample. Each first mass spectrum is then inspected with a filter module for events of interest measured with the mass analyser within 5 seconds after the respective first mass spectrum has been obtained with the mass analyser 5. Whenever an event of interest is detected with the filter module, a second assay is obtained from the sample and mass analysed. In another example where no such inspection for events of interest is effected, every 30 minutes one second assay is obtained from the sample and mass analysed. In yet another example, every 30 minutes one second assay is obtained from the sample and mass analysed and in addition, the first mass spectra are inspected with the filter module for events of interest.

Figure 3:
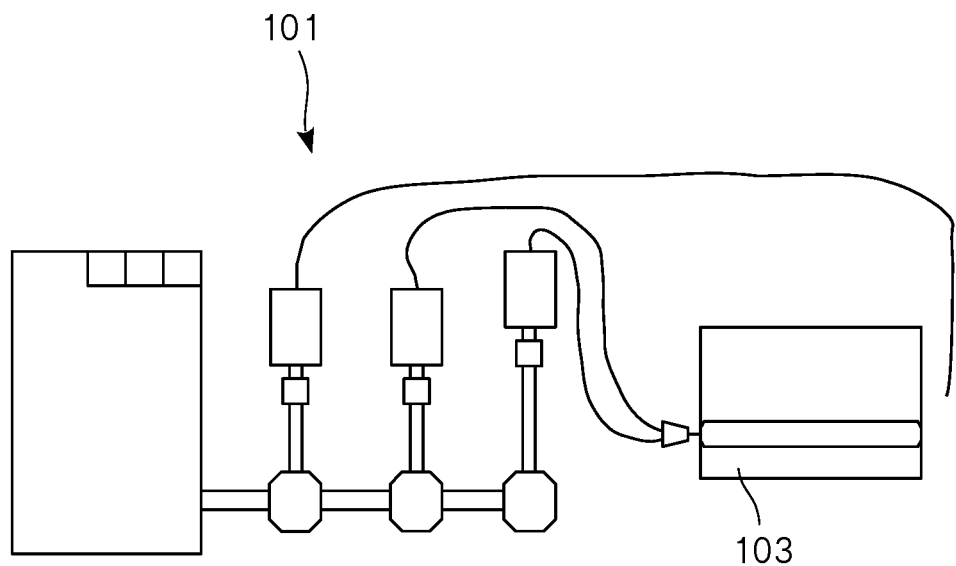

FIG. 3 shows a simplified schematic view of another apparatus 101 according to the invention for mass analysing a sample with the method according to the invention. In most parts, the apparatus 101 shown in FIG. 3 the same as the apparatus 1 shown in FIG. 1. As compared to the apparatus 1 shown in FIG. 1, the apparatus 101 shown in FIG. 3 however includes a chromatography column 103 being a liquid chromatography column.

Figure 4:
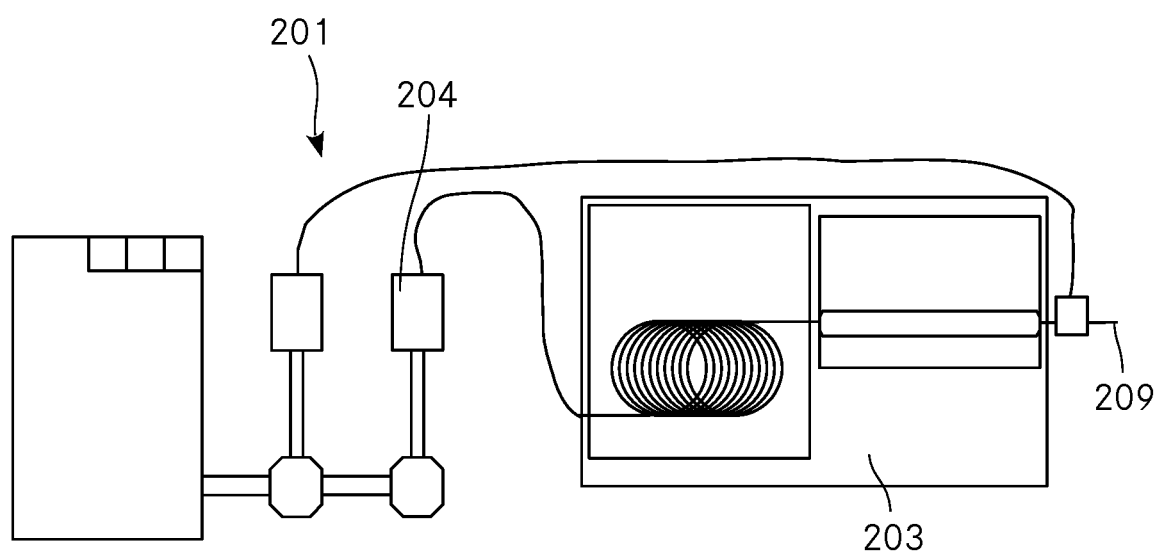

FIG. 4 shows a simplified schematic view of another apparatus 201 according to the invention for mass analysing a sample with the method according to the invention. In most parts, the apparatus 201 shown in FIG. 4 the same as the apparatuses 1, 101 shown in FIGS. 1 and 3. As compared to the apparatuses 1, 101 shown in FIGS. 1 and 3, respectively, the apparatus 201 shown in FIG. 4 however includes a chromatography column 203 being a liquid chromatography column with a gas chromatography column switched in series such that the second assay transferred through the chromatography column 203 is first passed through the liquid chromatography column and second through the gas chromatography column. Furthermore, the apparatus 201 shown in FIG. 4 differs from the apparatuses 1, 101 shown in FIGS. 1 and 3, respectively, in that it comprises one combined inlet 209 for inserting the assays into the apparatus 201 and in that it includes only one second ion source 204 and no dividing unit for dividing the chromatographically separated second assay into two parts.

Figure 5:
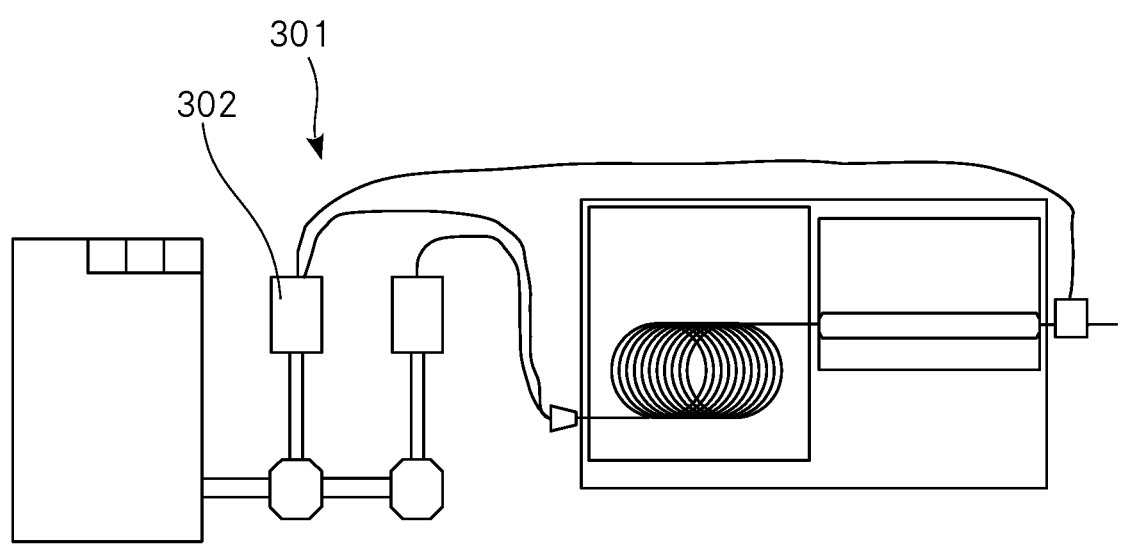

FIG. 5 shows a simplified schematic view of yet another apparatus 301 according to the invention for mass analysing a sample with the method according to the invention. In most parts, the apparatus 301 shown in FIG. 5 the same as the apparatus 201 shown in FIG. 4. In contrast to the apparatus 201 shown in FIG. 4, however, the apparatus 301 shown in FIG. 5 includes like the apparatuses 1, 101 shown in FIGS. 1 and 3 a dividing unit for dividing the chromatographically separated second assay into two parts. Thereby, as compared to the apparatuses 1, 101, 201 shown in the previous figures, in the apparatus 301 shown in FIG. 5, the first ion source is a combined first and second ion source 302. Thus, it is used to ionise the first assay to first sample ions and it is as well used to ionise one part of the chromatographically separated second assay to second sample ions. This way, the apparatus is constructed simpler because there is one ion source less required.

In yet another example where the apparatus includes two second ion sources, the chromatography column includes the liquid chromatography column and the gas chromatography column. In this example, however, the liquid chromatography column and the gas chromatography column are switched in parallel. Thus, the second assay is divided into two parts before being passed through the chromatography column. Thereby, one part of the second assay is transferred via the liquid chromatography column for chromatographic separation to one of the second ion sources, while the other part of the second assay is transferred via the gas chromatography column for chromatographic separation to the other one of the second ion sources. In another example, the chromatography column comprises two parallel switched gas chromatography columns, while in yet another example, the chromatography column comprises two parallel switched liquid chromatography columns.

The apparatus and method according to the invention are not limited to the examples illustrated above. For example, if the apparatus includes two or more second ion sources and even though in the method the chromatographically separates second assay is ionised by two or more second ion sources to the second sample ions, the second sample ions ionised by the different second ion sources can be transferred to the mass analyser together for obtaining at least one second mass spectrum of all the second sample ions ionised by the different second ion sources together. In this case as well as in the case where the apparatus only comprises one second ion source or in case in the method, only one second ion source is employed, the above described overall sequence only comprises one second overall sequence element.

In summary, it is to be noted that a method and an apparatus for mass analysing a sample by ionising the sample to first sample ions and to second sample ions and by obtaining mass spectra from the first sample ions and the second sample ions with a mass analyser are provided, the method and the apparatus pertaining to the technical field initially mentioned, that enable an optimised targeted analysis and an improved non-targeted analysis of the sample in a cost effective way.

We claim:

1. A method for mass analysing a sample by ionising said sample to first sample ions and to second sample ions and by obtaining mass spectra from said first sample ions and said second sample ions with a mass analyser, including
   a) repeatedly, obtaining a first assay from said sample, transferring said first assay past any chromatography column to a first ion source and ionising said first assay by said first ion source to said first sample ions, transferring said first sample ions obtained from the respective said first assay to said mass analyser and obtaining at least one first mass spectrum with said mass analyser from said first sample ions obtained from the respective said first assay and ionised by and transferred from said first ion source, and
   b) at least once, obtaining a second assay from said sample within a time window being associated with the respective said second assay and having a window width, transferring the respective said second assay for chromatographic separation via a chromatography column to at least one second ion source in that after being chromatographically separated, the respective said second assay eluting from said chromatography column is transferred to said at least one second ion source, ionising the respective said second assay by said at least one second ion source to said second sample ions, transferring said second sample ions obtained from the respective said second assay to said mass analyser and obtaining at least one second mass spectrum with said mass analyser from said second sample ions obtained from the respective said second assay which has been ionised by and transferred from said at least one second ion source, and
   c) assigning each one of said at least one second mass spectrum to one or more of said at least one first mass spectrum from said first sample ions obtained from one of said first assays which has been obtained from said sample within said time window associated with the respective said second assay which has been chromatographically separated and ionised by said at least one second ion source to said second sample ions from which the respective one of said at least one second mass spectrum has been obtained.

2. The method according to claim 1, wherein the method includes repeatedly, obtaining said second assay from said sample, each time within a respective time window being associated with the respective one of said second assay and having a window width, transferring the respective said second assay for chromatographic separation via a chromatography column to said at least one second ion source in that after being chromatographically separated, the respective said second assay is transferred to said at least one second ion source, ionising the respective said second assay by said at least one second ion source to said second sample ions, transferring said second sample ions obtained from the respective said second assay to said mass analyser and obtaining at least one second mass spectrum with said mass analyser from said second sample ions obtained from the respective said second assay which has been ionised by and transferred from said at least one second ion source, and assigning each one of said at least one second mass spectrum to one or more of said at least one first mass spectrum from said first sample ions obtained from one of said first assays which has been obtained from said sample within the respective said time window associated with the respective said second assay which has been chromatographically separated and ionised by said at least one second ion source to said second sample ions from which the respective one of said at least one second mass spectrum has been obtained.

3. The method according to claim 1, wherein said window width of said time window is 5 minutes or less.

4. The method according to claim 1, wherein the method includes transferring to said at least one second ion source a stream of chromatographically separated shares of the respective said second assay after being chromatographically separated and eluting from said chromatography column, ionising said stream of chromatographically separated shares of the respective said second assay by said at least one second ion source to a corresponding stream of chromatographically separated shares of said second sample ions, transferring said stream of chromatographically separated shares of said second sample ions to said mass analyser in a time evolution corresponding to a time evolution of said stream of chromatographically separated shares of the respective said second assay eluting from said chromatography column, and obtaining successively at least ten second mass spectra with said mass analyser from said stream of chromatographically separated shares of said second sample ions for accessing information about a time dependent evolution of constituent parts of said stream of chromatographically separated shares of the respective said second assay in said at least ten second mass spectra.

5. The method according to claim 1, wherein said at least one second ion source are at least two second ion sources, wherein the method includes transferring to said at least two second ion sources the respective said second assay after being chromatographically separated and eluting from said chromatography column by dividing the respective said second assay eluted from said chromatography column into parts, transferring to each one of said at least two second ion sources another one of said parts, wherein the method further includes ionising by each one of said at least two second ion sources the respective one of said parts which is transferred to the respective one of said at least two second ion sources to said second sample ions, transferring said second sample ions obtained from the respective said second assay to said mass analyser and obtaining at least one second mass spectrum with said mass analyser from second sample ions obtained from the respective said second assay which has been ionised by and transferred from said at least two second ion sources.

6. The method according to claim 5, wherein the method includes obtaining with said mass analyser for each one of said at least two second ion sources, at least one second mass spectrum from said second sample ions obtained from the respective said second assay.

7. The method according to claim 6, wherein the method includes obtaining a sequence of second mass spectra with said mass analyser by using said at least two second ion sources in a second ion source sequence having second ion source sequence elements, wherein, as the respective said second assay eluting from said chromatography column is transferred to said at least two second ion sources after being chromatographically separated in that the respective said second assay eluted from said chromatography column is divided into parts, wherein to each one of said at least two second ion sources, another one of said parts transferred, and as by each one of said at least two second ion sources, the respective one of said parts which is transferred to the respective one of said at least two second ion sources is ionised to said second sample ions, in each second ion source sequence element, said second sample ions ionised by only one of said at least two second ion sources are transferred to said mass analyser and at least one second mass spectrum is obtained with said mass analyser from only said second sample ions ionised by only the respective one of said at least two second ion sources, wherein the respective one of said at least two second ion sources is assigned to the respective second ion source sequence element, wherein said second ion source sequence includes at least two different second ion source elements, each having a different one of at least two second ion sources being assigned to it.

8. The method according to claim 5, wherein the method includes obtaining with said mass analyser for each one of said at least two second ion sources at least one second mass spectrum from said second sample ions obtained from the respective one of said parts which has been ionised by and transferred from the respective one of said at least two second ion sources to said mass analyser.

9. The method according to claim 1, wherein the method includes obtaining an overall sequence of first and second mass spectra with said mass analyser in that, as the respective said second assay eluting from said chromatography column is transferred to said at least one second ion source and ionised by said at least one second ion source to said second sample ions, said first ion source and said at least one second ion sources are used in an overall sequence having overall sequence elements, wherein a) in a first overall sequence element of said overall sequence, said first sample ions obtained from the respective said first assay are transferred to said mass analyser and at least one first mass spectrum is obtained with said mass analyser from only said first sample ions obtained from the respective said first assay and ionised by and transferred from said first ion source, and b) in a second overall sequence element of said overall sequence, said second sample ions obtained from the respective said second assay are transferred to said mass analyser and at least one second mass spectrum is obtained with said mass analyser from only said second sample ions obtained from the respective said second assay which has been ionised by and transferred from said at least one second ion source.

10. The method according to claim 1, wherein said first ion source is separate from said at least one second ion source.

11. The method according to claim 1, wherein said first ion source is a chemical ionisation ion source.

12. The method according to claim 1, wherein one of said at least one second ion source is a chemical ionisation ion source.

13. The method according to claim 1, wherein at least one of said at least one second ion source is an electron ionisation ion source.

14. The method according to claim 1, wherein the chromatography column includes a liquid chromatography column.

15. The method according to claim 1, wherein the chromatography column includes a gas chromatography column.

16. An apparatus for mass analysing a sample with the method according to claim 1, wherein said apparatus includes:
- a) a first ion source for repeatedly receiving a first assay obtained from said sample and for ionising the respective said first assay to first sample ions;
- b) a chromatography column for receiving at least once a second assay for chromatographically separating the respective said second assay by passing the respective said second assay through said chromatography column, wherein the respective said second assay has been obtained from said sample within a time window associated with the respective said second assay, said time window having a window width;
- c) at least one second ion source fluidly coupled to said chromatography column for receiving and ionising to second sample ions the respective said second assay eluting from said chromatography column;
- d) a mass analyser fluidly coupled to said first ion source for receiving said first sample ions obtained from the respective said first assay and for obtaining at least one first mass spectrum signal with said mass analyser from said first sample ions obtained from the respective said first assay for obtaining said at least one first mass spectrum and ionised by and received from said first ion source, wherein said mass analyser is additionally fluidly coupled to said at least one second ion source for receiving said second sample ions and for obtaining at least one second mass spectrum signal from said second sample ions obtained from the respective said second assay which has been ionised by and received from said at least one second ion source for obtaining said at least one second mass spectrum;
- e) a mass spectrum acquisition arrangement for obtaining at least one first mass spectrum from said at least one first mass spectrum signal and for obtaining at least one second mass spectrum from said at least one second mass spectrum signal, and
- f) an assignment module for assigning each one of said at least one second mass spectrum to one or more of said at least one first mass spectrum from said first sample ions obtained from one of said first assays which has been obtained from said sample within said time window associated with the respective said second assay which has been chromatographically separated and ionised by said at least one second ion source to said second sample ions from which the respective one of said at least one second mass spectrum has been obtained.

17. The method according to claim 1, wherein said window width of said time window is 1 minute or less.

18. The method according to claim 1, wherein said window width of said time window is 10 seconds or less.

19. The method according to claim 1, wherein the method includes transferring to said at least one second ion source a stream of chromatographically separated shares of the respective said second assay after being chromatographically separated and eluting from said chromatography column, ionising said stream of chromatographically separated shares of the respective said assay by said at least one second ion source to a corresponding stream of chromatographically separated shares of said second sample ions, transferring said stream of chromatographically separated shares of said second sample ions to said mass analyser in a time evolution corresponding to a time evolution of said stream of chromatographically separated shares of the respective second assay eluting from said chromatography column and obtaining successively at least twenty second mass spectra with said mass analyser from said stream of chromatographically separated shares of said second sample ions for accessing information about a time dependent evolution of constituent parts of said stream of chromatographically separated shares of the respective said second assay in said at least twenty second mass spectra.

* * * * *